US006567858B1

(12) United States Patent
Yang et al.

(10) Patent No.: US 6,567,858 B1
(45) Date of Patent: May 20, 2003

(54) OPTIMAL ALL-TO-ALL PERSONALIZED EXCHANGE IN OPTICAL MULTISTAGE NETWORKS

(75) Inventors: Jianchao Yang, Cambridge, MA (US); Yuan Yuan Yang, Port Jefferson, NY (US)

(73) Assignees: Verizon Laboratories Inc., Waltham, MA (US); The University of Vermont, Burlington, VT (US)

( * ) Notice: Subject to any disclaimer, the term of this patent is extended or adjusted under 35 U.S.C. 154(b) by 0 days.

(21) Appl. No.: 09/400,004

(22) Filed: Sep. 20, 1999

(51) Int. Cl.[7] .............................................. G06F 15/173
(52) U.S. Cl. ........................................ 709/238; 712/11
(58) Field of Search ................................. 709/238, 243, 709/244; 359/123; 712/11, 15; 710/316

(56) References Cited

U.S. PATENT DOCUMENTS 5,142,686 A * 8/1992 Hecht et al. ................... 712/11
5,937,117 A * 8/1999 Ishida et al. .................. 359/123

FOREIGN PATENT DOCUMENTS

EP 1017243 A2 * 5/2000 ........... H04Q/11/00

OTHER PUBLICATIONS

Barry, Richard et al.; "Latin Routers, Design, and Implementation", Journal of Lightwave Technology, Jun. 1993, v11, Issue 5.*
Kumar, S. et al.; "Faster Algorithms for Optical Switch Configuration", IEEE International Conference on Communications, Jun. 1997; ISBN 0–7803–3925–8.*
Gannon, D. et al., "On the Impact of Communication Complexity in the Design of Parallel Numerical Algorithms", *IEEE Trans. Computer*, vol. C–33, pp. 1180–1194, Dec. 1984.

Johnsson, S.L., "Communication Efficient Basic Linear Algebra Computations on Hypercube Architectures," *Journal of Parallel Distributed Computing*, vol. 4, pp. 133–172, Apr. 1987.
Scott, D.S., "Efficient All-to-All Communication Patterns in Hypercube and Mesh Topologies," *Proc. of 6th Distributed Memory Computing Conference*, pp. 398–403, 1991.
Thakur, R. et al., "All–to–All Communication on Meshes with Wormhole Routing," *Proc. of 8th IEEE International Parallel Processing Symposium*, pp. 561–565, Apr. 1994.
Tseng, Y.–C. et al., "All–to–All Pesonalized Communication in a Wormhole–Routed Torus," *IEEE Trans. Parallel and Distributed Systems*, vol. 7, No. 5, pp. 498–505, May 1996.
Tseng, Y.–C. et al., "Bandwidth–Optimal Complete Exchange on Wormhole Routed 2D/3D Torus Networks: A Diagonal–Propagation Approach," *IEEE Trans. Parallel and Distributed Systems*, vol. 8, No. 4, pp. 380–396, Apr. 1997.
Petrini, F., "Total–Exchange on Wormhole k–ary N–cubes with Adaptive Routing," *Proc. of the First Merged IEEE Int. Parallel Proc. Symposium & Symposium on Parallel and Distributed Processing*, pp. 267–271, Orlando, FL, Mar. 1998.
Suh, Y.J. et al., "All–to–All Communication with Minimum Start–up Costs in 2D/3D Tori and Meshes", *IEEE Trans. Parallel and Distributed Systems*, vol. 9, No. 5, pp. 442–458, May 1998.

(List continued on next page.)

Primary Examiner—Mark H. Rinehart
Assistant Examiner—Marc D. Thompson
(74) Attorney, Agent, or Firm—Leonard Charles Suchyta; James K. Weixel

(57) ABSTRACT

Systems and methods are presented to achieve crosstalk-free all-to-all exchange in optical multistage self-routing networks. The approach involves the computation of a Latin square and the subsequent decomposition of its rows to semi-permutations. Processors may then send messages to other processors in accord with these semi-permutations.

20 Claims, 11 Drawing Sheets

OTHER PUBLICATIONS

Suh, Y.J. et al., "Efficient All–to–All Personalized Exchange in Multidimensional Torus Networks," *Proc. of 1998 Int. Conference on Parallel Processing*, pp. 468–475, Aug. 1998.

Yang, Y. et al., "Optimal All–to–All Personalized Exchange in Multistage Networks," *University of Vermont Computer Science Research Report*, 1998.

Pan, Y. et al., "Optical Multistage Interconnection Networks: New Challenges and Approaches," *IEEE Communications*, special issue on Optical Networks and Communication Systems, vol. 37, No. 2, pp. 50–56, Feb. 1999.

Yang, Y. et al., "Permutation Capability of Optical Multistage Interconnection Networks," *Proc. of 12th IEEE International Parallel Processing Symposium*, Orlando, FL, Mar. 1998, pp. 125–133.

Qiao, C. et al., "A Time Domain Approach for Avoiding Crosstalk in Optical Blocking Multistage Interconnection Networks," *J. Lightwave Technology*, vol. 12, No. 10, pp. 1854–1862, Oct. 1994.

* cited by examiner

OPTIMAL ALL-TO-ALL PERSONALIZED EXCHANGE IN OPTICAL MULTISTAGE NETWORKS

STATEMENT REGARDING FEDERALLY SPONSORED RESEARCH OR DEVELOPMENT

This invention was made with Government support under Grant No. DAAH 04-96-1-0234, awarded by the U.S. Army Research Office, and Grant No. OSR-935-0540, awarded by the National Science Foundation. The Government has certain rights in this invention.

FIELD OF THE INVENTION

This application relates to the field of parallel computing and networking, and more specifically to all-to-all personalized exchange in multistage networks.

BACKGROUND OF THE INVENTION

Communication among processors may be a design issue when, for example, a parallel processing system is built, or a parallel procedure is designed. With advances in silicon and Ga—As technologies, processor speed may soon reach the gigahertz (GHz) range. Traditional metal-based communication technology used in parallel computing systems is becoming a potential bottleneck. Progress in the traditional interconnects, or to in the new interconnect technologies, such as optics, would be well received in the parallel computing systems community.

Advances in electro-optic technologies have made optical communication a promising networking choice to meet the increasing demands for high channel bandwidth and low communication latency of high-performance computing/communication applications. Fiber optic communications offer a combination of high bandwidth, low error probability, and gigabit transmission capacity. They have been extensively used in wide-area networks and have received much attention in the parallel processing community as well. In fact, many commercial, massively parallel computers, such as the Cray C90, use optical technology in their communication subsystems.

Using new optical technologies in parallel computers may require us to reexamine the design of interconnection networks, and use of parallel processing procedures. Exploring the capabilities of the optical technology may involve a careful analysis of the properties of optics, a proposal of new performance measures, a design of new interconnection networks and routing procedures, and new parallel processing application procedures.

Multistage interconnection networks (MINs), hereafter also referred to as multistage networks, have been used for interconnecting purposes in parallel computing systems. A MIN can be blocking, such as a Banyan network, rearrangeably non-blocking, such as a Benes network, non-blocking, such as crossbar. Additionally, a MIN may have variably connecting capabilities, from rearrangeable for permutation to non-blocking for multicast, such as in a Clos-network, depending on the number of stages, the number of switches, the switch capability, and the interconnection patterns used between stages.

As optical technology advances, there has been a growing interest in using optical technology for implementing interconnection networks and switches. Although electronic MINs and optical MINs have many similarities, here are some fundamental differences between them. Because of some unique properties of optics, traditional routing procedures and results may not be applicable here. New research addressing optical MINs may be useful.

In the communication pattern known as all-to-all personalized exchange, every processor in a processor group sends a distinct message to every other processor in the group. All-to-all personalized exchange occurs in many important parallel computing/networking applications, such as matrix transposition and fast Fourier transform (FFT).

The issue of realizing all-to-all personalized exchange in optical multistage networks is examined below. A basic element of optical switching networks is a directional coupler with two inputs and two outputs (hereafter referred to simply as switches). Depending on the control voltage applied to it, an input optical signal is coupled to either of the two outputs, setting the switch to either the parallel or the crossing state. A class of topologies that can be used to construct optical networks is multistage interconnection networks (MINs), which interconnect their inputs and outputs via several stages of switches.

Advances in electro-optic technologies have made optical communication a promising networking choice to meet the increasing demands for high channel bandwidth and low communication latency of high-performance computing/communication applications. Although optical multistage networks hold great promise and have demonstrated advantages over their electronic counterpart, they also introduce new challenges such as how to deal with the unique problem of avoiding crosstalk in the optical switches, which may occur when two signal channels in a switch interact with each other.

There are two ways in which optical signals can interact in a planar switching network. The channels carrying the signals may cross each other in order to embed a particular topology. Alternatively, two paths sharing a switch may experience some undesired coupling from one path to another within a switch. It would be desirable to achieve optical exchange in multistage networks in a manner that reduces crosstalk.

SUMMARY OF THE INVENTION

Methods and systems are presented below involving optical multistage interconnection networks (MiNs). Although optical MINs hold great promise and have demonstrated advantages over their electronic counterparts, they also present their own problems. Due to certain optical properties, crosstalk in optical switches should be avoided if they are to work efficiently. The concept of a semi-permutation is introduced to analyze the permutation capability of optical MINs under the constraint of avoided crosstalk in several types of MINs. In particular, an optimal scheme for realizing crosstalk-free all-to-all personalized exchange in a class of unique-path, self-routing optical multistage networks is presented.

The basic idea of realizing all-to-all personalized exchange in such a multistage network is to transform it to a collection of the above-mentioned semi-permutations. Each of the semi-permutations can be realized crosstalk-free in a single pass (i.e., in a single, concurrent exchange of signals) and can take advantage of pipelined message transmission in consecutive passes.

More specifically, a method for crosstalk-free all-to-all exchange in an optical multistage network having inputs and outputs coupled to processors is presented. The method comprises sending messages between the processors in multiple passes, wherein, in each of the multiple passes, each of the processors transmits, in one-to-one fashion, a message to one of the processors by way of the inputs and outputs, in accord with semi-permutations decomposed from permutations corresponding to rows of a matrix. The optical multistage network may be one of a baseline network, omega network, Banyan network, and their reverse networks.

In each of the multiple passes, each of the processors may transmit, in one-to-one fashion, a message to one of the processors by way of the inputs and outputs, in accord with semi-permutations decomposed from permutations corresponding to rows of a Latin square. The semi-permutations may be obtained by computing two input sets.

A method is also presented for crosstalk-free all-to-all exchange in an optical multistage network having n inputs and n outputs coupled to n processors, where n $\in \{2, 4, 8, 16, \ldots\}$ and wherein each of the n processors is connected to one of the n inputs and one of the n outputs, comprising computing a Latin square having n rows and n columns; associating the n rows with n admissible permutations, each of the n admissible permutations being a one-to-one mapping from $N=\{0,1,\ldots,n-1\}$ to itself; for j a member of the set $\{1, 2, \ldots, n\}$, decomposing a jth permutation, from among the n admissible permutations, into two semi-permutations, one of the two semi-permutations, $s^{(j)}$, being a restriction of said mapping to a subset, $S^{(j)}$, of N having n/2 elements, and another of the two semi-permutations, $t^{(j)}$, being a restriction of said mapping to a subset, $T^{(j)}$, of N where $T^{(j)}$ is a complement $N\setminus S^{(j)}$; sending n/2 messages in a (2j−1)th pass, and n/2 messages in a (2j)th pass, each of the messages departing from one of the n processors, traveling through one of the n inputs and one of the n outputs, and arriving at one of the n processors, wherein a kth processor from among the n processors sends a message to an lth processor from among the n processors in the (2j-1)th pass if, and only if, $s^{(j)}(k)=1$, and a qth processor from among the n processors sends a message to an rth processor from among the n processors in the (2j)th pass if, and only if, $t^{(j)}(q)=r$, and for different $j=1,\ldots,n$, repeating said step of decomposing a jth permutation from among the n admissible permutations until all of the n admissible permutations have been decomposed; for different $j=1,\ldots,n$, repeating the step of sending n/2 messages in a (2j−1)th pass, and n/2 messages in a (2j)th pass until $n^2$ messages have been sent, and 2n passes have occurred, corresponding to 2n decompositions of the n admissible permutations.

Computing a Latin square having n rows and n columns may include computing a Latin square off-line. The optical multistage network may be one of a baseline network, omega network, Banyan network, and their reverse networks. The optical multistage network may include $m=\log_2 n$ stages, each having one switch with two switch settings, interspersed by m−1 interstage links, wherein computing a Latin square may include computing a Latin square so that each of the n rows corresponds, in one-to-one fashion, with a configuration of switch settings. The method may further comprise composing each of the n admissible permutations as a composition of 2m−1 permutations, a jth permutation from among the n admissible permutations composed as $$\sigma^{(j)}_{m-1} \pi^{(j)}_{m-2} \sigma^{(j)}_{m-2} \ldots \pi^{(j)}_0 \sigma^{(j)}_0,$$

such that to each of the m stages there is associated a stage permutation and to each of the m−1 interstage links there is associated an interstage link permutation, where the stage permutation corresponding to the jth permutation from among the n admissible permutations, and associated with an ith stage is denoted by $\sigma^{(j)}_i$, with $i=1,\ldots,m$, and the interstage link permutation corresponding to the jth permutation from among the n admissible permutations, and associated with an ith interstage link is denoted by $\pi^{(j)}_i$, with $i=1,\ldots,m-1$.

Also presented below is a method of achieving all-to-all crosstalk-free exchange in an optical multistage network, said network having an even number, $n \geq 2$, of processors, comprising computing an n×n matrix $$\begin{bmatrix} a_{0,0} & a_{0,1} & \ldots & a_{0,n-1} \\ a_{1,0} & a_{1,1} & \ldots & a_{1,n-1} \\ \vdots & \vdots & \vdots & \vdots \\ a_{n-1,0} & a_{n-1,1} & \ldots & a_{n-1,n-1} \end{bmatrix}$$

such that each entry of the matrix is chosen from the set $N=\{0,1,\ldots,n-1\}$, and such that the members of each row equals the set N, and the members of each column equals the set N; mapping the matrix to a column vector of permutations, $$\begin{bmatrix} \rho^{(0)} \\ \rho^{(1)} \\ \vdots \\ \rho^{(n-1)} \end{bmatrix}$$

where a jth entry of the column vector of permutations, $\rho^{(j)}$, is given by $$\begin{pmatrix} 0 & 1 & 2 & \ldots & n-1 \\ a_{j,0} & a_{j,1} & a_{j,2} & \ldots & a_{j,n-1} \end{pmatrix};$$

decomposing each permutation, $\rho^{(j)}$, into two semi-permutations, $s^{(j)}$, and $t^{(j)}$, each of which can be realized crosstalk-free, given by $$s^{(j)} = \begin{pmatrix} b_{j,0} & b_{j,1} & \ldots & b_{j,n/2-1} \\ c_{j,0} & c_{j,1} & \ldots & c_{j,n/2-1} \end{pmatrix} \text{ and}$$

$$t^{(j)} = \begin{pmatrix} d_{j,0} & d_{j,1} & \ldots & d_{j,n/2-1} \\ e_{j,0} & e_{j,1} & \ldots & e_{j,n/2-1} \end{pmatrix},$$

where $s^{(j)}$ is a restriction of the permutation $\rho^{(j)}$ to a subset, $S^{(j)}$, of N having n/2 elements, and $t^{(j)}$ is a restriction of the permutation $\rho^{(j)}$ to a subset, $T^{(j)}$, of N where $T^{(j)}$ is a complement $N\setminus S^{(j)}$; in a first pass, sending messages from processor $b_{0j}$ to processor $c_{0j}$ for $j=0,\ldots,n/2-1$; in a second pass, sending messages from $d_{0j}$ to processor $e_{0j}$ for $j=0,\ldots,n/2-1$; in a third pass, sending messages from processor $b_{1j}$ to processor $c_{1j}$ for $j=0,\ldots,n/2-1$; and in a fourth pass, sending messages from $d_{1j}$ to processor $e_{1j}$ for $j=0,\ldots,n/2-1$.

Also presented below is a method of achieving all-to-all crosstalk-free exchange in an optical multistage network, said network having an even number, $n \geq 2$, of processors, comprising computing an n×n matrix $$\begin{bmatrix} a_{0,0} & a_{0,1} & \ldots & a_{0,n-1} \\ a_{1,0} & a_{1,1} & \ldots & a_{1,n-1} \\ \vdots & \vdots & \vdots & \vdots \\ a_{n-1,0} & a_{n-1,1} & \ldots & a_{n-1,n-1} \end{bmatrix}$$

such that each entry of the matrix is chosen from the set $N=\{0,1,\ldots,n-1\}$, and such that the members of each row equals the set N, and the members of each column equals the set N; mapping the matrix to a column vector of permutations $$\begin{bmatrix} \rho^{(0)} \\ \rho^{(1)} \\ \vdots \\ \rho^{(n-1)} \end{bmatrix}$$

where a jth entry of the column vector of permutations, $\rho^{(j)}$, is given by $$\begin{pmatrix} 0 & 1 & 2 & \ldots & n-1 \\ a_{j,0} & a_{j,1} & a_{j,2} & \ldots & a_{j,n-1} \end{pmatrix};$$

decomposing each permutation, $\rho^{(j)}$, into two semi-permutations, $s^{(j)}$, and $t^{(j)}$, each of which can be realized crosstalk-free, given by $$s^{(j)} = \begin{pmatrix} b_{j,0} & b_{j,1} & \ldots & b_{j,n/2-1} \\ c_{j,0} & c_{j,1} & \ldots & c_{j,n/2-1} \end{pmatrix} \text{ and}$$

$$t^{(j)} = \begin{pmatrix} d_{j,0} & d_{j,1} & \ldots & d_{j,n/2-1} \\ e_{j,0} & e_{j,1} & \ldots & e_{j,n/2-1} \end{pmatrix},$$

where $s^{(j)}$ is a restriction of the permutation $\rho^{(j)}$ to a subset, $S^{(j)}$, of N having n/2 elements, and $t^{(j)}$ is a restriction of the permutation $\rho^{(j)}$ to a subset, $T^{(j)}$, of N where $T^{(j)}$ is a complement $N \backslash S^{(j)}$; in a (2i−1)th pass, sending messages from processor $b_{i-1,j}$ to processor $c_{i-1,j}$ for j=0, . . . , n/2−1, for i=1, . . . , n; in a (2i)th pass, sending messages from $d_{i-1,j}$ to processor $e_{i-1,j}$ for j=0, . . . , n/2−1, for i=1, . . . , n.

A system for all-to-all crosstalk-free exchange is also presented below that includes an optical multistage network associated with a Latin square having n columns and n rows, wherein the optical multistage network includes an even number, n≧2, of processors coupled to said processors; instructions for said processors to associate the n rows with n admissible permutations, each of the n admissible permutations being a one-to-one mapping from N={0,1, . . . , n−1} to itself; for j a member of the set {1, 2, . . . , n}, instructions for said processors to decompose a jth permutation from among the n admissible permutations into two semi-permutations, one of the two semi-permutations, $s^{(j)}$, being a restriction of said mapping to a subset, $S^{(j)}$, of N having n/2 elements, and another of the two semi-permutations, $t^{(j)}$, being a restriction of said mapping to a subset, $T^{(j)}$, of N where $T^{(j)}$ is a complement $N \backslash S^{(j)}$; instructions for said processors to initiate the transmittal of n/2 messages in a (2j−1)th pass, and n/2 messages in a (2j)th pass, each of the messages departing from one of the n processors, traveling through one of the n inputs and one of the n outputs, and arriving at one of the n processors, wherein a kth processor from among the n processors sends a message to an lth processor from among the n processors in the (2j−1)th pass if, and only if, $s^{(j)}(k)=l$, and a qth processor from among the n processors sends a message to an rth processor from among the n processors in the (2j)th pass if, and only if, $t^{(j)}(q)=r$; and for different j=1, . . . , n, instructions for said processors to continue to decompose a jth permutation from among the n admissible permutations until all of the n admissible permutations have been decomposed; and for different j=1, . . . , n, instructions for said processors to continue to send n/2 messages in a (2j−1)th pass, and n/2 messages in a (2j)th pass until $n^2$ messages have been sent, and 2n passes have occurred, corresponding to 2n decompositions of the n admissible permutations.

The optical multistage network may include one of a Banyan network, an omega network, a baseline network, and their reverse networks. The instructions for the processors to decompose a jth permutation from among the n admissible permutations into two semi-permutations may include computing two input sets in a time of the order O(n).

A system for crosstalk-free all-to-all exchange in an optical multistage network is also presented that comprises processors; and instructions for said processors to send messages between the processors in multiple passes, wherein, in each of the multiple passes, each of the processors transmits, in one-to-one fashion, a message to one of the processors in accord with semi-permutations decomposed from permutations corresponding to rows of a matrix. The matrix may be a Latin square.

The instructions for said processors to send messages between the processors may include instructions to compute input sets from which the semi-permutations may be obtained in a time on the order of O(n) where the Latin square is an n×n matrix. Instructions may be included to compute two input sets from which the semi-permutations may be obtained.

BRIEF DESCRIPTION OF THE DRAWINGS

The following figures depict certain illustrative embodiments of the invention in which like reference numerals refer to like elements. These depicted embodiments are to be understood as illustrative of the invention and not as limiting in any way.

DETAILED DESCRIPTION OF THE PREFERRED EMBODIMENTS

To provide an overall understanding of the invention, certain methods, systems and devices will be discussed with reference to all-to-all exchange in baseline networks. However, it will be understood by persons of ordinary skill in the art that the general methods, systems and devices described herein are equally applicable to other types of networks in which all-to-all crosstalk-free exchange is desired.

A semi-permutation, which is a decomposition of a mathematical permutation (a more precise definition appears below), may be introduced as a useful tool for designing crosstalk-free routing in an optical multistage network in a manner described below. Herein, the properties of semi-permutations in the context of crosstalk-free routing are explored, and all-to-all personalized exchange procedures in optical multistage networks based on crosstalk-free semi-permutations are developed. In general, realizing all-to-all personalized exchange in an optical multistage network involves associating multistage networks with multiple semi-permutations each of which can be realized crosstalk-free in a single pass, and taking advantage of pipelined message transmission in consecutive passes.

Figure 1:
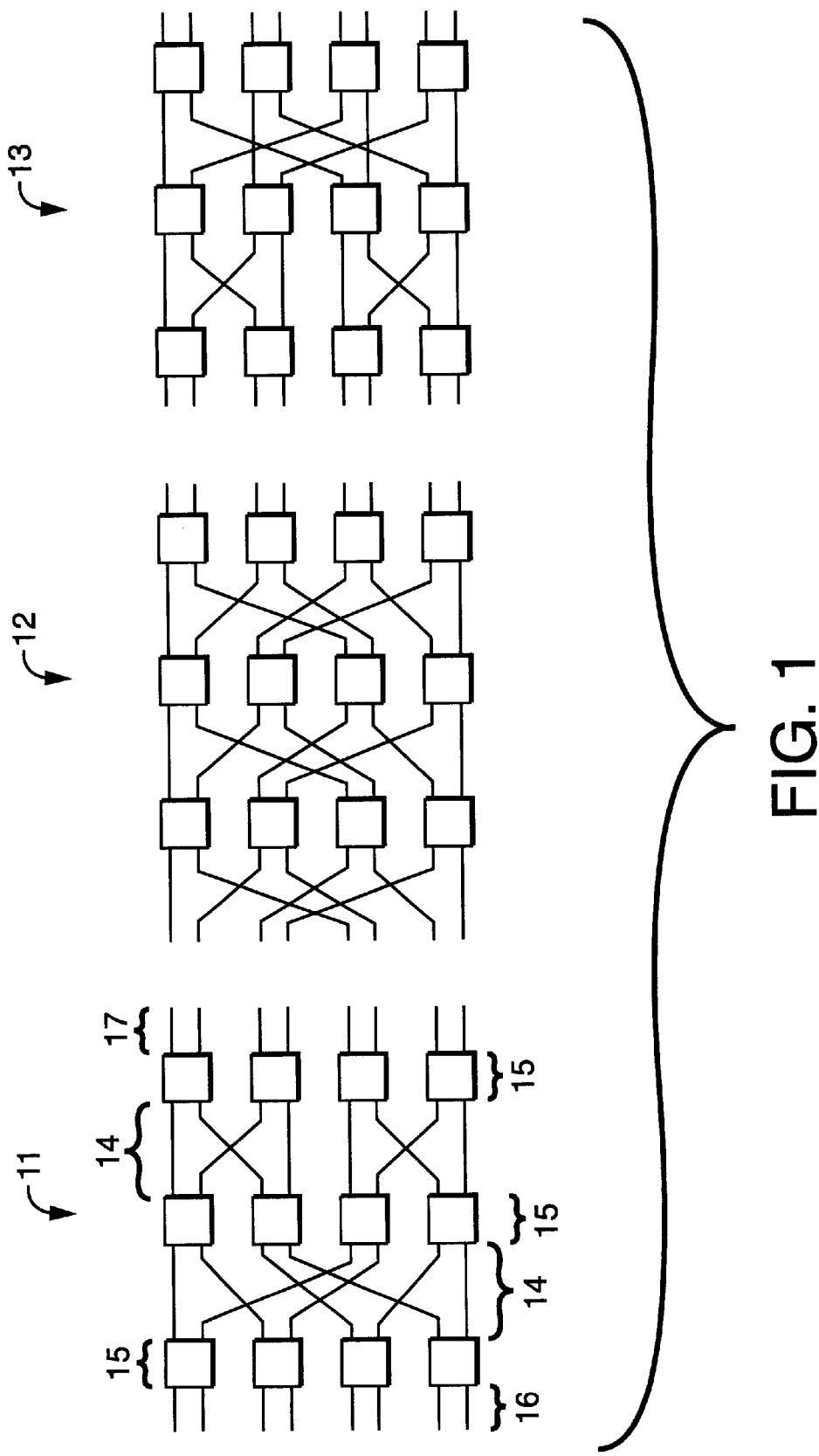
FIG. 1 shows three examples of multistage networks of the prior art.

Referring to FIG. 1, an 8×8 baseline network 11, an omega network 12, and a Banyan network 13 are shown. Each network includes network inputs 16 and outputs 17, and interstage links 14, and stages 15.

A permutation is a one-to-one mapping between the network inputs and outputs. Any permutation may be realized in a Benes network in a single pass (in the electronic version), and any permutation can be realized in a Benes network in two passes crosstalk-free (in the optical version). However, the switch setting in a Benes network is complex and expensive, which may discourage people to choose this type of network for a high speed communication environment. Moreover, a full permutation capability may not be necessary for all-to-all personalized exchange. Herein, a class of unique-path, self-routing multistage networks such as baseline 11, omega 12, Banyan 13 networks, and their reverse networks are considered. A typical network structure for this class has $n(=2^{nt})$ inputs 16 and outputs 17 and $\log_2 n=m$ stages 15, with each stage consisting of n/2 2×2 switches, and any two adjacent stages connected by n interstage links 14.

A baseline network 11, an omega network 12, and a Banyan network 13 are examples of network configurations that have several advantages. These networks, for example, impose less hardware cost (almost half of that of a Benes network), and have fast switch settings (self-routing) at the stages 15. On the other hand, the limitations of networks such as a baseline network 11, an omega network 12, and a Banyan network 13 are that not every permutation is admissible to such a network, and not every admissible permutation to the network can be decomposed to semi-permutations which, can be realized in a single pass crosstalk-free in the network. However, such limitations do not prohibit us to find some special permutations and semi-permutations which can be used for efficiently realizing all-to-all personalized exchange in such networks. Such message exchanges initiate at processors (not shown in FIG. 1) each of which may be connected to one input and one output (eight inputs 16 and eight outputs 17 are shown in FIG. 1.). The message proceeds from one of the inputs 16, through one of the stages 15 and one of the interstage links 14, then through more stages IS and interstage links 14, in alternating fashion, until the message exits through one of the network outputs 17. From the network outputs, the message arrives at a processor.

A permutation is a one-to-one mapping between the network inputs and outputs.

For an n×n network, suppose there is a one-to-one mapping $\rho$ which maps input i to output $a_i$(i.e., $\rho(i)=a_i$)$a_i \in \{0, 1, \ldots, n-1\}$ for $0 \leq i \leq n-1$, and $a_i \neq a_j$. Let $$\rho = \begin{pmatrix} 0 & 1 & \ldots & n-1 \\ a_0 & a_1 & \ldots & a_{n-1} \end{pmatrix}$$

denote this permutation. In particular, when $\rho(i)=i$ for $0 \leq n-1$, this permutation is referred to as an identity permutation and is denoted by I. A permutation which is realizable by the multistage network is referred to as an admissible permutation of the network.

Given two permutations $\rho_1$ and $\rho_2$, a composition $\rho_1\rho_2$ of the two permutations is also a permutation, which maps i to $\rho_1(\rho_2(i))$. Clearly, $\rho I=I\rho=\rho$, but in general $\rho_1\rho_2 \neq \rho_2\rho_1$. However, the associative law does apply here. That is, $\rho_1(\rho_2\rho_3)=(\rho_1\rho_2)\rho_3$. (Let $\rho^i$ denote the composition of i permutations $\rho$'s. Also, if $\rho_1\rho_2=I,\rho_1$ is referred to as the inverse of $\rho_2$ and vice versa, $\rho_1=\rho_2^{-1}$ and $\rho_2=\rho_1^{-1}$. In addition, for representational convenience, the following notation is used to represent a mapping $\rho(a)=b$ $$a \xrightarrow{\rho} b$$

When realizing a permutation in an optical multistage network in a single pass, as discussed earlier, switches suffer crosstalk. Semi-permutations may be introduced as a useful tool for crosstalk-free routing in an optical multistage network consisting of 2×2 switches.

Given an even integer n, a semi-permutation is defined as a one-to-one mapping between some n/2 inputs $\{x_0, x_1, \ldots, x_{n/2-1}\}$ and some n/2 outputs $\{(y_0, y_1, \ldots, y_{n/2-1}\}$ satisfying $$\left\{\left\lfloor\frac{x_0}{2}\right\rfloor, \left\lfloor\frac{x_1}{2}\right\rfloor, \ldots, \left\lfloor\frac{x_{\frac{n}{2}-1}}{n}\right\rfloor\right\} = \qquad (1)$$

$$\left\{\left\lfloor\frac{y_0}{2}\right\rfloor, \left\lfloor\frac{y_1}{2}\right\rfloor, \ldots, \left\lfloor\frac{y_{\frac{n}{2}-1}}{2}\right\rfloor\right\} = \left\{0, 1, \ldots, \frac{n}{2}-1\right\}$$

where $x_i, y_i \in \{0, 1, \ldots, n-1\}$, $y_i \neq y_j$ for $0 \leq i \neq j \leq n/2-1$, and $x_0 < x_1 < \ldots < x_{n/2-1}$. The semi-permutation is denoted by $$s = \begin{pmatrix} x_0 & x_1 & \ldots & x_{\frac{n}{2}-1} \\ y_0 & y_1 & \ldots & y_{\frac{n}{2}-1} \end{pmatrix}, \qquad (2)$$

and the input set $$\{x_0, x_1, \ldots, x_{n/2-1}\}$$

is denoted by InputSet(s) and the output set $$\{y_0, y_1, \ldots, y_{n/2-1}\}$$

is denoted by OutputSet(s). For example, for n=8, the following one-to-one mapping $$\begin{pmatrix} 0 & 3 & 4 & 6 \\ 1 & 5 & 3 & 7 \end{pmatrix}$$

is a semi-permutation since $$\left\{\left\lfloor\frac{0}{2}\right\rfloor, \left\lfloor\frac{3}{2}\right\rfloor, \left\lfloor\frac{4}{2}\right\rfloor, \left\lfloor\frac{6}{2}\right\rfloor\right\} = \{0, 1, 2, 3\}, \text{ and}$$

$$\left\{ \left\lfloor \frac{1}{2} \right\rfloor, \left\lfloor \frac{5}{2} \right\rfloor, \left\lfloor \frac{3}{2} \right\rfloor, \left\lfloor \frac{7}{2} \right\rfloor \right\} = \{0, 2, 1, 3\} = \{0, 1, 2, 3\}.$$

A semi-permutation is a partial permutation that ensures that there is only one active link passing through each input switch and output switch. The use of semi-permutations helps eliminate crosstalk in the first and last stages in the network. Thus, semi-permutations may be realized in an optical network crosstalk-free. To ensure that the entire network is crosstalk-free, signals must travel crosstalk-free through the switches in the intermediate stages as well.

The following result regarding the relationship between permutations is useful.

Theorem 1. Any permutation can be decomposed into two semi-permutations.

The proof, together with an efficient decomposition procedure, may be found in Y. Yang, J. Wang, and Y. Pan, *Permutation Capability of Optical Multistage Interconnection Networks*, Proc. of 12th IEEE International Parallel Processing Symposium, Orlando, Fla., March 1998, pp. 125–133. There might be multiple different decompositions from a single permutation. However, for a permutation which is realizable in a multistage network, there may not exist a decomposition for the permutation such that the resulting semi-permutations are realizable in the network crosstalk-free.

Given two semi-permutations decomposed from a permutation, one semi-permutation is referred to as the twin of the other. Let the two semi-permutations be s and t, respectively. Then InputSet(*s*)∪InputSet(*t*)OutputSet(*s*)∪OutputSet(*t*)={0, 1, . . . , n−1}.

Figure 2:
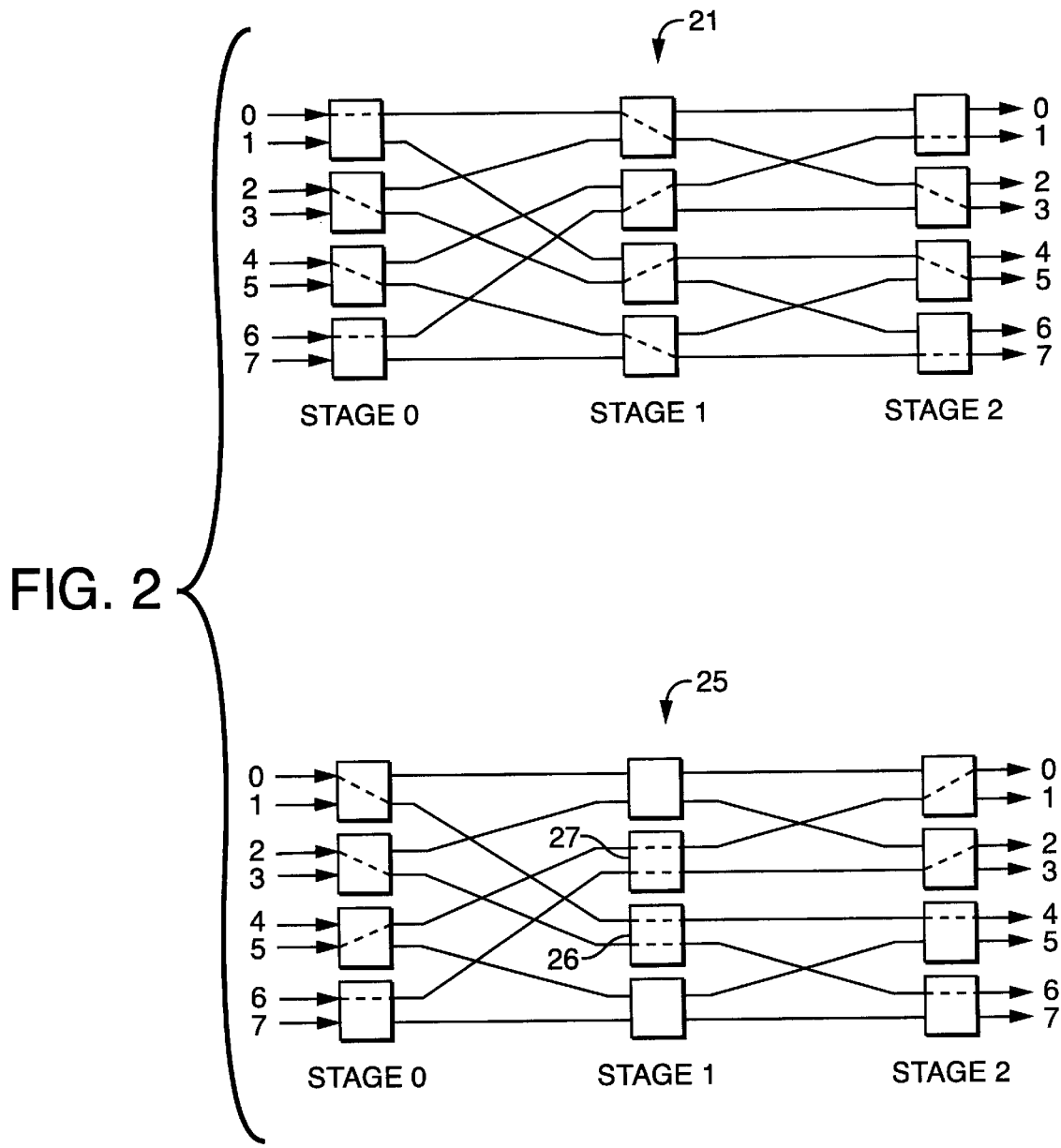
FIG. 2 shows examples of semi-permutations that can and cannot be realized in an 8×8 baseline network.

If a semi-permutation can be realized in a multistage network in a single pass crosstalk-free, it is referred to as a crosstalk-free semi permutation for this network. In FIG. 2, examples of semi-permutations for an 8×8 baseline network are depicted. Paths 21 show that $$\begin{pmatrix} 0 & 2 & 4 & 6 \\ 3 & 5 & 7 & 1 \end{pmatrix}$$

is a crosstalk-free semi-permutation for the network; paths 25, on the other hand, show that the semi-permutation $$\begin{pmatrix} 0 & 2 & 5 & 6 \\ 4 & 6 & 0 & 2 \end{pmatrix}$$

cannot be realized in a single pass crosstalk-free. In paths 21, each switch supports one, and only one, path. Paths 25 do not represent a crosstalk-free semi-permutation because two switches support two paths each, while two other switches support no paths. The bold boxes 26 and 27 indicate the two switches with crosstalk.

Lemma 1. For the two semi-permutations decomposed from an admissible permutation of a multistage network, if one is crosstalk-free for the network, so is the other.

Proof. Let the two semi-permutations be $s_1$ and $s_2$, respectively. Suppose $s_1$ is crosstalk-free for an n×n multistage network, but $s_2$ is not. Thus, there exist two paths, among the n/2 paths of $s_2$ in the network, which go through the same switch in some intermediate stage in the network. This implies that none of the n/2 paths of its twin, $s_1$, goes through this switch. Since there are n/2 switches in each stage of the network, there must be two paths of $s_1$ that go through a single switch in that stage, which contradicts that $s_1$ is crosstalk-free for the network.

From paths 21, the twin semi-permutation $$\begin{pmatrix} 1 & 3 & 5 & 7 \\ 6 & 0 & 2 & 4 \end{pmatrix}$$

is also crosstalk-free for the network. A decomposition of a permutation is called a crosstalk-free decomposition to a multistage network if its semi-permutations are crosstalk-free realizable to the network.

The concept of composition of permutations to semi-permutations may also be extended. Given two semi-permutations $s_1$ and $s_2$ with InputSet($s_1$)=OutputSet($s_2$), a composition $s_1 s_2$ is defined as the mapping that i is mapped to $s_1(s_2(i))$ for i ∈InputSet($s_2$). The composition of two semi-permutations $s_1$ and $s_2$ is also a semi-permutation with the input set being InputSet($s_2$) and the output set being OutputSet($s_1$). The composition of more than one semi-permutation may be defined iteratively. Let $s_1 s_2$ be a composition of two semi-permutations $s_1$ and $s_2$, and let $s_3$ be the third semi-permutations satisfying InputSet($s_1 s_2$)= OutputSet($s_3$), i.e., InputSet($s_2$)=OutputSet($s_3$), then $s_1 s_2 s_3$ is a composition defined as ($s_1 s_2$)$s_3$ with the input set being InputSet($s_3$) and the output set being OutputSet($s_1$). It can be verified that the associate law holds for the composition operation, that is, ($s_2$)$s_3$=$s_1$($s_2 s_3$).

In the context of a multistage network, each stage and each interstage link in the network may be viewed as a shorter n×n network. Let $\sigma_i$(0≤i≤m−1) denote the permutation represented by stage i, and $\pi_i$(0≤i≤m−2) denote the permutation represented by the set of interstage links between stage i and stage i+1. The permutation $\sigma_i$, and the permutation $\pi_i$ are known as a stage and an interstage permutation, respectively. An admissible permutation of a multistage network can be expressed by a composition of stage permutations and interstage permutations. For example, an admissible permutation of a baseline network can be expressed as $$\sigma_{m-1}\pi_{m-2}\sigma_{m-2} \cdots \pi_0 \sigma_0 \qquad (3)$$

In general, interstage permutations $\pi_i$'s are fixed by the network topology. For a baseline network, suppose the binary representation of a number a ∈{0,1, . . . , n−1} is $p_{m-1}p_{m-2} \cdots p_1 p_0$. Then permutation $\pi_i$ represents the following mapping $$p_{m-1}p_{m-2}\cdots p_1 p_0 \overset{\pi_i}{\rightarrow} p_{m-1}p_{m-2}\cdots p_{m-i}p_0 p_{m-i-1}\cdots p_2 p_1 \qquad (4)$$

This mapping corresponds to a 1-bit circular right-shift among the nt−i least significant bits while keeping the i most significant bits unchanged. However, stage permutation $\sigma_1$'s are not fixed since each switch can be set to either parallel or crossing.

Figure 3:
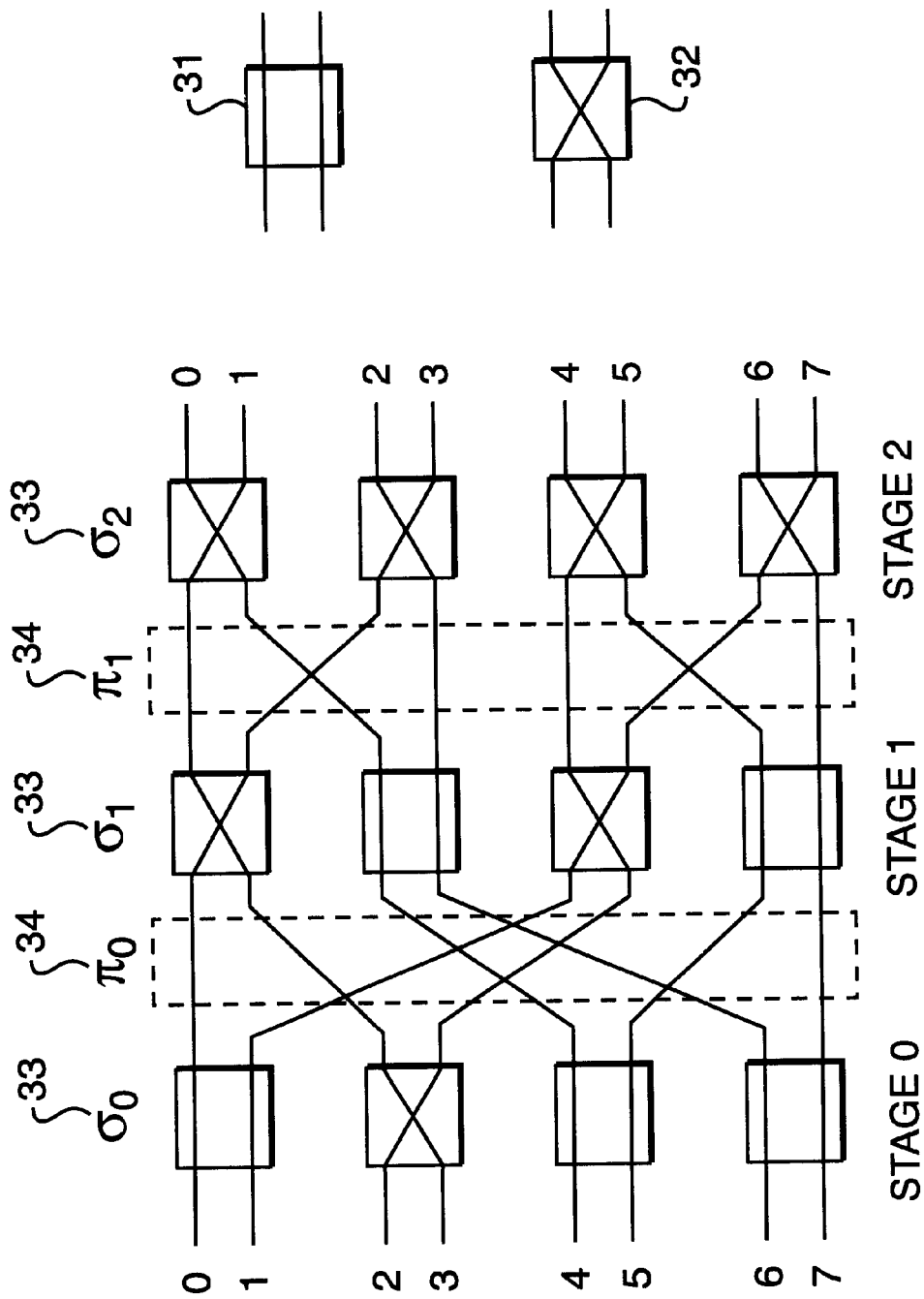
FIG. 3 shows a routing example in an 8×8 baseline network.

Referring to FIG. 3, each switch is set to a parallel configuration 31 or a crossing configuration 32. Stage permutations 33 include $\sigma_0$, $\sigma_1$ and $\sigma_2$ which correspond to the permutations with only the second switch set to crossing, only the first and third switches set to crossing, and all four switches set to crossing, respectively:

$$\sigma_0 = \begin{pmatrix} 0 & 1 & 2 & 3 & 4 & 5 & 6 & 7 \\ 0 & 1 & 3 & 2 & 4 & 5 & 6 & 7 \end{pmatrix},$$

$$\sigma_1 = \begin{pmatrix} 0 & 1 & 2 & 3 & 4 & 5 & 6 & 7 \\ 1 & 0 & 2 & 3 & 5 & 4 & 6 & 7 \end{pmatrix},$$

$$\sigma_2 = \begin{pmatrix} 0 & 1 & 2 & 3 & 4 & 5 & 6 & 7 \\ 1 & 0 & 3 & 2 & 5 & 4 & 7 & 6 \end{pmatrix}$$

and interstage permutations 34 (in both binary and decimal)

$$\pi_0 = \begin{pmatrix} 000 & 001 & 010 & 011 & 100 & 101 & 110 & 111 \\ 000 & 100 & 001 & 101 & 010 & 110 & 011 & 111 \end{pmatrix} =$$

$$\begin{pmatrix} 0 & 1 & 2 & 3 & 4 & 5 & 6 & 7 \\ 0 & 4 & 1 & 5 & 2 & 6 & 3 & 7 \end{pmatrix}$$

$$\pi_1 = \begin{pmatrix} 000 & 001 & 010 & 011 & 100 & 101 & 110 & 111 \\ 000 & 010 & 001 & 011 & 100 & 110 & 101 & 111 \end{pmatrix} =$$

$$\begin{pmatrix} 0 & 1 & 2 & 3 & 4 & 5 & 6 & 7 \\ 0 & 2 & 1 & 3 & 4 & 6 & 5 & 7 \end{pmatrix}$$

For input 0, the following transformation may be obtained $$0 \xrightarrow{\sigma_4} 0 \xrightarrow{\pi_4} 0 \xrightarrow{\sigma_1} 1 \xrightarrow{\pi_1} 2 \xrightarrow{\sigma_2} 3$$

that is, $$0 \xrightarrow{\sigma_2 \pi_1 \sigma_1 \pi_0 \sigma_0} 3$$

After computing the transformation for every input, the overall permutation for the switch settings in the network may be obtained $$\sigma_2 \pi_1 \sigma_1 \pi_0 \sigma_0 = \begin{pmatrix} 0 & 1 & 2 & 3 & 4 & 5 & 6 & 7 \\ 3 & 7 & 5 & 1 & 0 & 4 & 2 & 6 \end{pmatrix}$$

Notice that not every permutation is admissible to a multistage network like baseline, omega, Banyan and their reverse network. Also, not every admissible permutation of the network has a crosstalk-free decomposition, for which a counterexample is provided below. However, the following Lemma specifies the conditions of existence of a crosstalk-free decomposition from an admissible permutation.

Lemma 2 Let an admissible permutation of a multistage network shown in (3) be denoted by $\rho_{2m-1}\rho_{2m-2} \cdots \rho_2\rho_1$. The admissible permutation can be decomposed into two crosstalk-free semi-permutations if and only if permutation $\rho_i$ can be decomposed into two semi-permutations $s_i$ and $t_i$ for $1 \leq 2m-1$ such that InputSet($s_{2m-1}$)=OutputSet($s_{2m-2}$)

InputSet($s_{2m-2}$)=Output(Set($s_{m-3}$))

...

InputSet($s_2$)=OutputSet($s_1$)    (5)

The two crosstalk-free semi-permutations obtained are $s_{2m-1}s_{2m-2} \cdots s_2s_1$ and $t_{2m-1}t_{2m-2} \cdots t_2t_1$, respectively.

Proof. If $\rho_i$ can be decomposed to $s_i$ and $t_i$ for $1 \leq i \leq 2m-1$ and satisfy (5), then $s_{2m-1}s_{2m-2} \cdots s_2s_1$ form a composition of these semi-permutations. That is, given any $k \in \text{InputSet}(s_1)$, it can be mapped by $s_1$ to $s_1(k) \in \text{OutputSet}(s_1) = \text{InputSet}$ ($s_2$), then mapped by $s_2$ to $s_2s_1(k) \in \text{OutputSet}(s_2) = \text{InputSet}(s_3)$, . . . , and finally mapped by $s_{2m-1}$ to $s_{2m-1}s_{2m-2} \cdots s_2s_1(k) \in \text{OutputSet}(s_{2m-1})$. Since each $s_1$ is a semi-permutation and any input set and output set of a semi-permutation satisfy (1), no two such paths from InputSet($s_1$) to OutputSet($s_{2m-1}$) pass the same switch in the network, and thus $s_i$ is crosstalk-free. The same conclusion can be drawn for $t_{2m-1}t_{2m-2} \cdots t_2t_1$. Also, the composition $s_{2m-1}s_{2m-2} \cdots s_2s_1$ and the composition $t_{2m-1}t_{2m-2} \cdots t_2t_1$ are semi-permutations with the input set InputSet($s_1$) and InputSet($t_1$), and the output set OutputSet($s_{2m-1}$) and OutputSet($t_{2m-1}$), respectively. Therefore, the admissible permutation is decomposed into two crosstalk-free semi-permutations $s_{2m-1}s_{2m-2} \cdots s_2s_1$ and $t_{2m-1}t_{2m-2} \cdots t_2t_1$.

On the other hand, if the admissible permutation can be decomposed to two crosstalk-free semi-permutations, $s_i$ may be constructed from $t_i$ from i=1 to 2m satisfying (5).

An approach to realizing all-to-all personalized exchange in multistage networks without the constraint of crosstalk-free, i.e., in (ordinary) electronic multistage networks, may be introduced. The approach may then be extended to realize all-to-all personalized exchange in optical multistage networks under the constraint of crosstalk-free.

Given n processors and an n×n multistage network, let processor i ($0 \leq i \leq n-1$) be connected to input i and ouput i of the network to other processors and receive messages from other processors through output i of the network.

The following lemma concerning a bound on the maximum communication delay of all-to-all personalized exchange in a multistage network holds.

Lemma 3 The maximum communication delay of all-to-all personalized exchange in an all n x n network of log n stages is at least $\Omega(n+\log n)$.

Proof. The lemma holds because each processor receives one message from all other n−1 processors, which takes $\Omega(n)$ time, and each message goes through log n stages from its source processor to its destination processor, which takes $\Omega(\log n)$ time.

A Latin square is defined as an n×n matrix $$\begin{bmatrix} a_{0,0} & a_{0,1} & \cdots & a_{0,n-1} \\ a_{1,0} & a_{1,1} & \cdots & a_{1,n-1} \\ \vdots & \vdots & \vdots & \vdots \\ a_{n-1,0} & a_{n-1,1} & \cdots & a_{n-1,n-1} \end{bmatrix}$$

in which the entries $a_{ij}$'s are numbers in $\{0, 1, 2, \ldots n-1\}$ and no two entries in a row (or a column) have the same value.

Now suppose that each row in the Latin square, $a_{i0}, a_{i1}, \ldots, a_{i,n-1}$ corresponds to a permutation $$\begin{pmatrix} 0 & 1 & 2 & \cdots & n-1 \\ a_{i,0} & a_{i,1} & a_{i,2} & \cdots & a_{i,n-1} \end{pmatrix},$$

which is admissible to an n×n self-routing multistage network. By realizing the n admissible permutations corresponding to the Latin square, all-to-all personalized exchange may be achieved.

That every message has the same length, so that the message transmission at each stage is synchronized, may be assumed. If the messages are not synchronized, then one may make them effectively synchronized. This may be done by forcing messages that take shorter than the maximum time needed to transmit a message to wait the difference. A higher-level description of the procedure ATAPE is given in Table I.

In procedure ATAPE, processor j sends distinct messages to all destinations in the order of $a_{0j}, a_{1j}, \ldots, a_{n-1,j}$, which corresponds to the column j of the Latin square. On the other hand, in time frame i, all n processors send their messages simultaneously to destinations $a_{i,0}, a_{i,1}, \ldots, a_{i,n-1}$, which corresponds to the row i, of the Latin square. Thus, in procedure ATAPE all-to-all personalized exchange is achieved by realizing n permutations which correspond to the n rows of the Latin square, since under the assumption that each permutation represented by a row of the Latin square is admissible to the network.

Note that the network under consideration is a self-routing network, where each switch is set automatically by the routing tag contained in the message passing that switch. Since admissible permutations are being considered, at any time two messages entering from the two inputs of a switch can pass the switch simultaneously without any conflicts. In addition, once the previous n messages leave the switches of the cUrrent stage, the next n messages can enter the switches of this stage. Thus, the sequential steps of 2.1 are actually performed in a pipelined fashion, which achieves a form of parallelism. Therefore, the time complexities of Step 1 and Step 2 are O(n) and O(n+log n), respectively. The total time delay for all-to-all personalized exchange procedure is O(n+log n), which generally matches the low bound of the communication delay for this type of network.

Now, consider realizing all-to-all personalized exchange in optical networks under the constraint of crosstalk-free. If each admissible permutation to the network can be decomposed to two crosstalk-free semi-permutations, the all-to-all personalized exchange in an optical multistage-network can be achieved by realizing these 2n semi-permutations in the network. The total delay is about twice that of the electronic counterpart. Since this process can still be performed in a pipelined fashion, the proposed all-to-all personalized exchange procedure achieves optimal communication delay for optical multistage networks as well.

TABLE I

All-to-all personalized exchange procedure for a class of multistage networks

Procedure ATAPE
begin
Step 1. for each processor j (0 ≤ j ≤ n-1) do in parallel
    1.1 for each $\alpha_{ij}$ (0 ≤ i ≤ n-1) in the Latin square do in sequential
        prepare a personalized message from processor j to processor $\alpha_{ij}$;
        insert the message into the message queue j;
Step 2. for each processor j (0 ≤ j ≤ n-1) do in parallel
    2.1 for each message with destination address $\alpha_{ij}$ (0 ≤ i ≤ n-1) in the
    message queue j do in sequential
        send message destined to $\alpha_{ij}$ through input j of the network;
end;

Not all permutations are admissible in a baseline network. However, in the following, a simple method is described for choosing a special set of permutations, which are admissible to a self-routing multistage network and can form a Latin square.

First, a set of basic permutations used for constructing a Latin Square is introduced. For an n×n mapping, where $n=2^m$, m basic permutations $\phi_i$ (1 ≤ i ≤ m) may be defined as follows. Let the binary representation of a number $\alpha \in \{0, 1, \ldots, n-1\}$ be $p_{m-1}p_{m-2} \ldots p_1 p_0$. Then $$p_{m-1}p_{m-2} \ldots p_i p_{i-1} p_{i-2} \ldots p_1 p_0 \xrightarrow{\phi_i} p_{m-1}p_{m-2} \ldots \overline{p_i} p_{i-1} p_{i-2} \ldots p_1 p_0 \quad (6)$$

Figure 4:
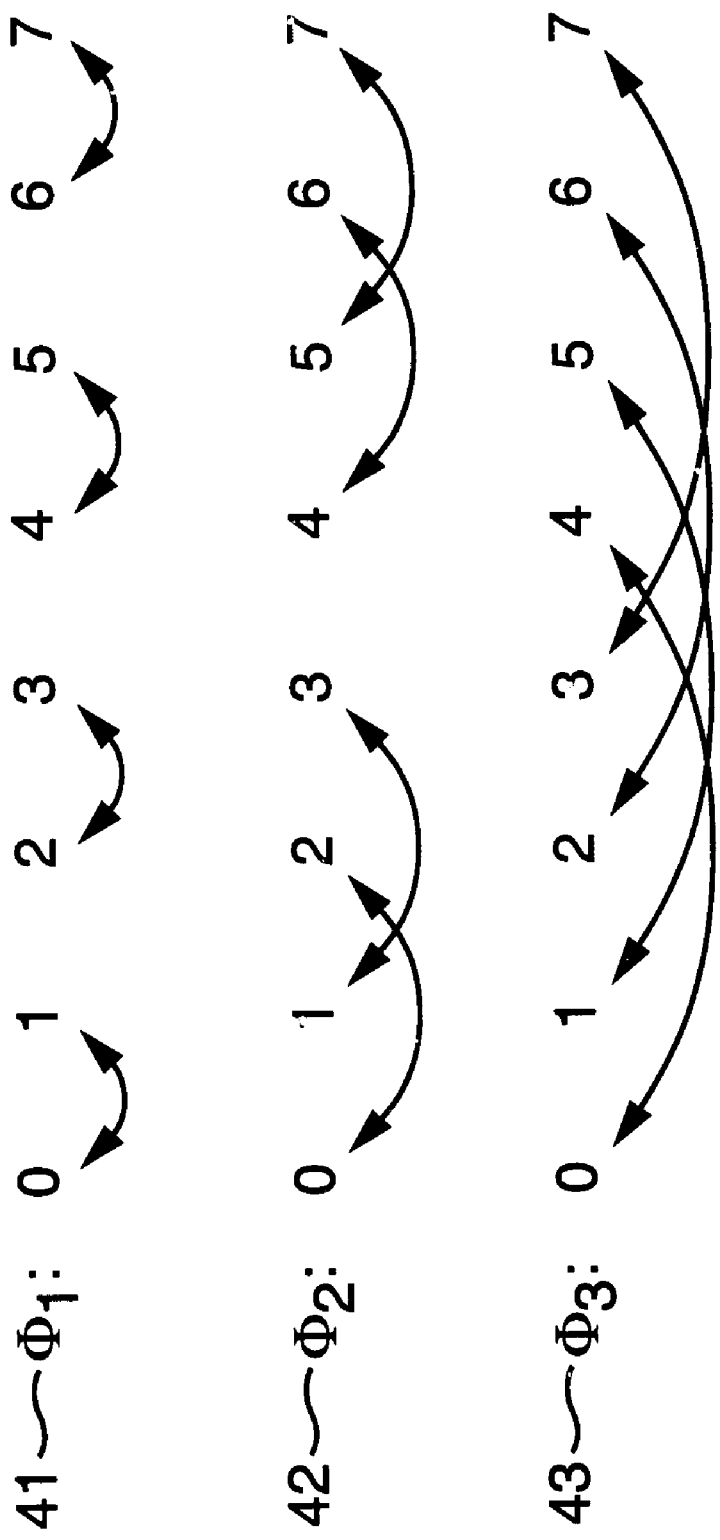
FIG. 4 shows an example of basic permutations for an 8×8 mapping.

The permutation $\phi_i$ is actually the operation flipping the $i^{th}$ bit of a binary number. For example, the three basic permutations for n=8 are the mapping $$\phi_1 = \begin{pmatrix} 0 & 1 & 2 & 3 & 4 & 5 & 6 & 7 \\ 1 & 0 & 3 & 2 & 5 & 4 & 7 & 6 \end{pmatrix},$$

$$\phi_2 = \begin{pmatrix} 0 & 1 & 2 & 3 & 4 & 5 & 6 & 7 \\ 2 & 3 & 0 & 1 & 6 & 7 & 4 & 5 \end{pmatrix},$$

$$\phi_3 = \begin{pmatrix} 0 & 1 & 2 & 3 & 4 & 5 & 6 & 7 \\ 4 & 5 & 6 & 7 & 0 & 1 & 2 & 3 \end{pmatrix},$$

which are shown in FIG. 4. The first permutation corresponds to the $\phi_1$ basic permutation 41, the second permutation to the $\phi_2$ basic permutation 42, and the third permutation to the $\phi_3$ basic permutation. Each arc in FIG. 4 represents a mapping between two numbers.

In describing the construction of all-to-all personalized exchange Latin square in the following, interest especially lies in $\phi_1$. Other $\phi_i$'s are used in the proof in the appendix. The stage permutation of a stage in the network is $\phi_1$ if and only if the switches in this stage are all set to crossing, and the stage permutation of a stage in the network is I if and only if the switches in this stage are all set to parallel.

Theorem 2 Let the stage permutation of each stage in a baseline network take either $\phi_1$ or I, The admissible permutations corresponding to all possible such switch settings form a Latin square.
Proof. See Appendix.

Figure 5:
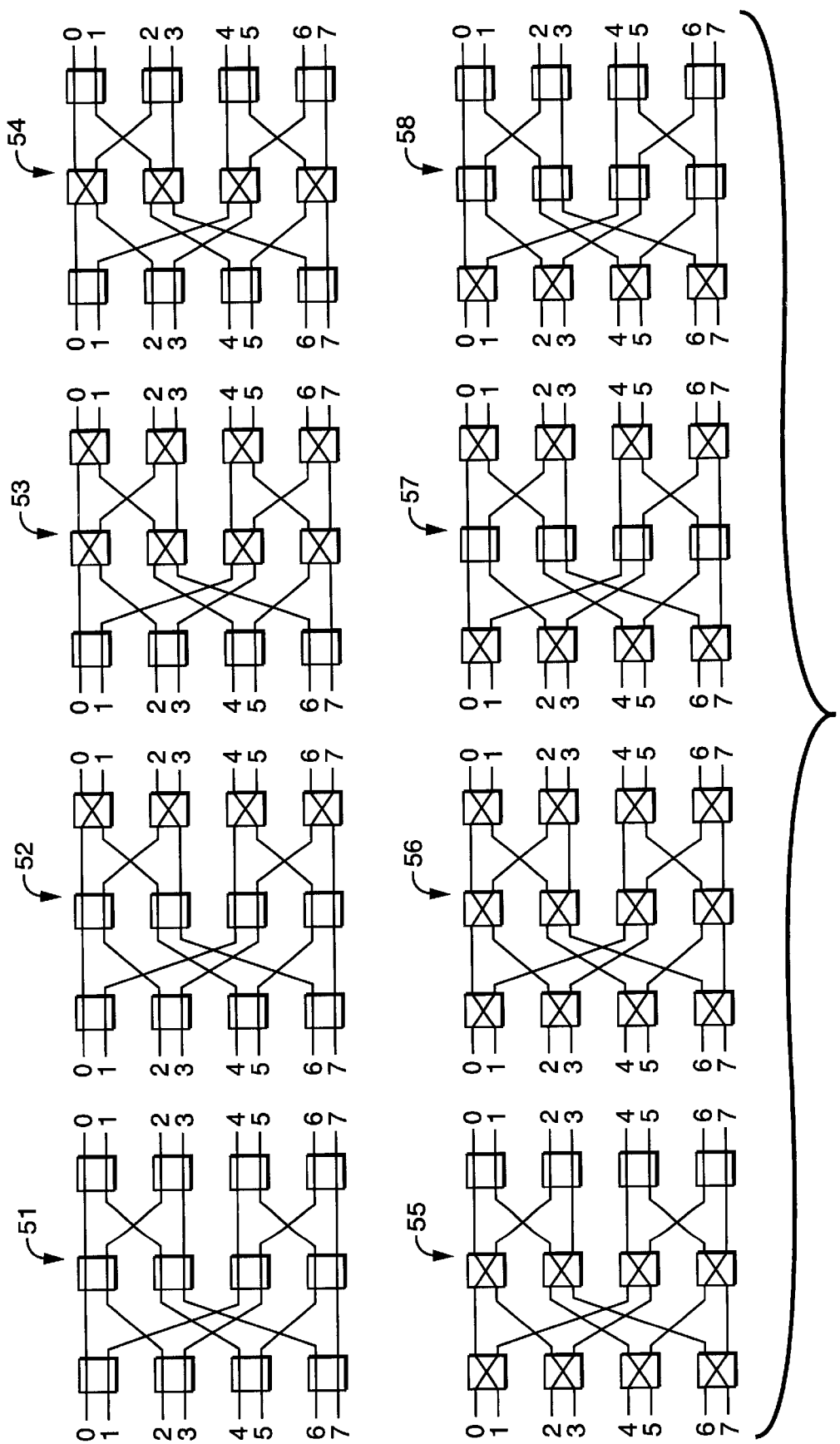
FIG. 5 shows all of the possible switch settings in which each stage is set to either parallel or crossing in an 8×8 baseline network.

In FIG. 5, all possible such switch settings in an 8×8 baseline network are listed. Each of the eight routing patterns corresponds to a row of the Latin square L, where:

$$L = \begin{bmatrix} 0 & 4 & 2 & 6 & 1 & 5 & 3 & 7 \\ 1 & 5 & 3 & 7 & 0 & 4 & 2 & 6 \\ 3 & 7 & 1 & 5 & 2 & 6 & 0 & 4 \\ 2 & 6 & 0 & 4 & 3 & 7 & 1 & 5 \\ 6 & 2 & 4 & 0 & 7 & 3 & 5 & 1 \\ 7 & 3 & 5 & 1 & 6 & 2 & 4 & 0 \\ 5 & 1 & 7 & 3 & 4 & 0 & 6 & 2 \\ 4 & 0 & 6 & 2 & 5 & 1 & 7 & 3 \end{bmatrix} \quad (7)$$

Thus, routing pattern 51 has switch settings I, I, and I in columns one, two, and three respectively and corresponds to the first row of the Latin square L; the routing pattern 52 has switch settings I,I, and $\phi_1$ in columns one, two, and three respectively and corresponds to the second row of the Latin square L; the routing pattern 53 has switch settings I, $\phi_1$, and $\phi_1$ in columns one,two, and three respectively and corresponds to the third row of the Latin square L; the routing pattern 54 has switch settings I, $\phi_1$, and I in columns one, two, and three respectively and corresponds to the fourth row of the Latin square L; the routing pattern 55 has switch settings $\phi_1$, $\phi_1$, and I in columns one, two, and three respectively and corresponds to the fifth row of the Latin square L; the routing pattern 56 has switch settings $\phi_1, \phi_1$, and $\phi_1$ in columns one, two, and three respectively and corresponds to the sixth row of the Latin square L; the routing pattern 57 has switch settings $\phi_1$. I, and $\phi_1$ in columns one, two, and three respectively and corresponds to the seventh row of the Latin square L; and the routing pattern 58 has switch settings $\phi_1$, I, and I in columns one, two, and three respectively and corresponds to the eighth row of the Latin square L.

The same conclusions as in Theorem 2 for other self-routing multistage networks, such as omega and Banyan networks, may be drawn.

Not every admissible permutation to the network can be decomposed into semi-permutations which can be realized in the network crosstalk-free. For example, the permutation $$\begin{pmatrix} 0 & 1 & 2 & 3 & 4 & 5 & 6 & 7 \\ 2 & 4 & 0 & 6 & 1 & 5 & 3 & 7 \end{pmatrix}$$

is admissible to an 8×8 baseline network. However, this permutation does not have a crosstalk-free decomposition. In fact, applying the decomposition procedure to this permutation, a unique decomposition of semi-permutations may be obtained:

$$\begin{pmatrix} 0 & 2 & 5 & 7 \\ 2 & 0 & 5 & 7 \end{pmatrix} \text{ and } \begin{pmatrix} 1 & 3 & 4 & 6 \\ 4 & 6 & 1 & 3 \end{pmatrix}$$

However, it can be verified that none can pass the network crosstalk-free.

However, it can be proved that any permutation in the special set of admissible permutations, which forms a Latin square as described above, does have a crosstalk-free decomposition of semi-permutations. Thus, all-to-all personalized exchanged can be realized in 2n passes in an n×n self-routing optical multistage network crosstalk-free.

Given a semi-permutation s as in (2), if the input set $\{x_0, x_1, \ldots x_{a/2-1}\}$ and the output set $\{y_0, y_1, \ldots, y_{a/2-1}\}$ are equal, the semi-permutation is said to be self-mapping, if the intersection of the two sets is empty (in other words, the union of the two sets is the whole set $\{0, 1, \ldots, n-1\}$, the semi-permutation is said to be opposite-mapping. The following are examples of self-mapping and opposite mapping semi-permutations in an 8×8 network:

self-mapping:

$$\begin{pmatrix} 0 & 3 & 5 & 6 \\ 0 & 5 & 6 & 3 \end{pmatrix}$$

opposite-mapping:

$$\begin{pmatrix} 0 & 3 & 5 & 6 \\ 1 & 4 & 7 & 2 \end{pmatrix}$$

As can be seen later, the special set of admissible permutations, which form the all-to-all personalized exchange Latin square as described above, can be decomposed to these two types of semi-permutations.

Lemma 4 If a semi-permutation is self-mapping, so is its twin semi-permutation. If a semi-permutation is opposite-mapping, so is its twin semi-permutation.

Proof: Let a semi-permutation and its twin semi-permutation in an n×n network be s and t respectively. If s is self-mapping, InputSet(s)=OutputSet(s), which yields InputSet(t)=OutputSet(t)=$\{0, 1 \ldots, n-1\}$-InputSet(s). Thus, t is self-mapping. If s is opposite-mapping, InputSet(s)=$\{0,1\ldots,n-1\}$-OutputSet(s), which is equivalent to $\{0, 1 \ldots n-1\}$-InputSet(t)=OutputSet(t). Hence, t is opposite-mapping.

Corollary 1 Suppose semi-permutation $s_2$ and $s_2$ can form a composition $s_1s_2$. If both $s_1$ and $s_2$ are self-mapping or both of them are opposite-mapping, then $s_1s_2$ is self-mapping. If one of them is self-mapping and the other is opposite-mapping, then $s_1s_2$ is opposite-mapping.

For the special permutations I and $\phi_1$, the following remarks hold.

Remark 1 Any permutation decomposed from I is self-mapping and any semi-permutation decomposed from $\phi_1$ is opposite-mapping.

Remark 2 Given any set C such that $|C|=n/2$ and, $\{\lfloor x/2 \rfloor | x \in C\}=\{0,1 \ldots n/2\}$, let D=$\{0,1, \ldots n-1\}$-C. Then the permutation I can be decomposed to two self-mapping semi-permutations $I_s$ and $I_t$ such that InputSet($I_s$)=C=OutputSet($I_s$) and InputSet($I_t$)=D=OutputSet($I_t$); and the permutation $\phi_1$ can be decomposed to two opposite-mapping semi-permutations $\phi_{1,s}$ and $\phi_{1,t}$, such that InputSet($\phi_{1,s}$)=C=OutputSet($\phi_{1,t}$) and OutputSet($\phi_{1,s}$)=D=InputSet($\phi_{1,t}$).

Remark 3 For any permutation p which is decomposed to two semi-permutations s and t, I can be decomposed to $I_s$ and $I_t$ such that both $sI_s$ and $tI_t$ are compositions of semi-permutations (in fact, $sI_s$ and $tI_t$=t, and I and its decomposition may be ignored); and $\phi_1$ can be decomposed to $\phi_{1,s}$ and $\phi_{1,t}$ such that both $s\phi_{1,s}$ and $s\phi_{1,s'}$ are compositions of semi-permutations, which implies $p\phi_1$ is decomposed to $s\phi_{1,s'}$ and $t\phi_{1,t'}$ in particular, if s and t are self-mapping (or opposite-mapping) then $s\phi_{1,s}$ and $t_{1,t'}$ are opposite-mapping (or self-mapping).

In order to decompose interstage permutations in a multistage network to self-mapping semi-permutations, a function Bits(x) may be used. Bits(x) is a function of the integer x that returns the number of 1's in the binary representation of x. For an n×n permutation where n=$2^m$, the following sets may be defined $$A=\{x|x\in\{0, 1, \ldots, n-1\} \text{ and Bits}(x) \text{ is even}\},$$

$$B=\{x|x\in\{0, 1, \ldots, n-1\} \text{ and Bits}(x) \text{ is odd}\}. \qquad (8)$$

The following Lemma reveals some properties of the sets A and B.

Lemma 5 For the sets defined in (8), A∩B is empty, $|A|=|B|=n/2$, and $$\left\{\left\lfloor\frac{x}{2}\right\rfloor, |x \in A\right\} = \left\{0, 1, \ldots, \frac{n}{2}\right\} = \left\{\left\lfloor\frac{x}{2}\right\rfloor, |x \in B\right\} \qquad (9)$$

Proof. From (8), A∩B is empty. By the definition of A and B, $$|A| = \binom{m}{0} + \binom{m}{2} + \binom{m}{4} + \ldots \text{ and}$$

$$|B| = \binom{m}{1} + \binom{m}{3} + \binom{m}{5} + \ldots$$

$$\text{thus } |A| = |B| = \frac{2^m}{2} = \frac{n}{2}.$$

Now, for any x∈A, $$\left\lfloor\frac{x}{2}\right\rfloor \in \left\{0, 1, 2, \ldots, \frac{n}{2}\right\}.$$

Since $|A|=n/2$, to prove the first part of (9), the inequality $$\left\lfloor \frac{x}{2} \right\rfloor \neq \left\lfloor \frac{x'}{2} \right\rfloor$$

for any x, x'∈A and x≠x' need only be verified. Suppose this is not true, i.e., $$\left\lfloor \frac{x}{2} \right\rfloor = \left\lfloor \frac{x'}{2} \right\rfloor.$$

Let the binary representations of x and x' be $p_{m-1}p_{m-2} \cdots p_1p_0$ and $p'_{m-1}p'_{m-2} \cdots p'_1p'_0$, respectively.

Then note that $$\left\lfloor \frac{x}{2} \right\rfloor = p_{m-1}p_{m-2} \cdots p_1 \text{ and } \left\lfloor \frac{x'}{2} \right\rfloor = p'_{m-1}p'_{m-2} \cdots p'_1.$$

Since $$\left\lfloor \frac{x}{2} \right\rfloor = \left\lfloor \frac{x'}{2} \right\rfloor$$

and x ≈x', $p_0 \not\approx p'_0$. It follows that among Bits(x) and Bits(x), one is an odd number and the other is an even number, which contradicts the fact that both x and x' belong to A.

Similarly, the second part of (9) may be proven. For example, for an 8×8 network, $$A=\{000, 011, 100, 110\}=\{0, 3, 5, 6\}$$

and $$B=\{001, 010, 100, 111\}=\{1, 2, 4, 7\}$$

Theorem 3 Any interstage permutation $\pi_i$, $0 \leq i \leq \log n-2$, in an n×n baseline network can be decomposed to two self-mapping semi-permutations with the input sets equal to A and B respectively.

Proof. As shown in (4), the mapping $\pi_i$ only shifts some bits and does not change the total number of 1's. Thus, for any x∈A, $\pi_i(x)$∈A. That is, $\pi_i$ is a one-to-one self-mapping of A. Meanwhile, let $A=\{x_0, x_1, \ldots, x_{n/2}\}$ with $x_0 < x_1 < \ldots < x_{n/2}$.
Then, note $\{\pi_i(x_0), \pi_i(x_1), \ldots, \pi_i(x_{n/2})\}=A$. Also from (9), $$s_i = \begin{pmatrix} x_0 & x_1 & \cdots & x_{\frac{n}{2}-1} \\ \pi_i(x_0) & \pi_i(x_1) & \cdots & \pi_i\left(x_{\frac{n}{2}-1}\right) \end{pmatrix}$$

is a semi-permutation with InputSet($s_i$)=OutputSet($s_i$)=A. Similarly, $$t_i = \begin{pmatrix} y_0 & y_1 & \cdots & y_{\frac{n}{2}-1} \\ \pi_i(y_0) & \pi_i(y_1) & \cdots & \pi_i\left(y_{\frac{n}{2}-1}\right) \end{pmatrix}$$

is a semi-permutation with InputSet($t_i$)=OutputSet($t_i$)=B, where $B=\{y_0, y_1, \ldots, y_{n/2}\}$ with $y_0 < y_1 < \ldots < y_{n/2}$. Therefore, the permutation $\pi_i$ is decomposed to self-mapping semi-permutations $s_i$ and $t_i$ with the input sets (also the output sets) being A and B respectively.

For example, when n=8, $$\pi_0 = \begin{pmatrix} 0 & 1 & 2 & 3 & 4 & 5 & 6 & 7 \\ 0 & 4 & 1 & 5 & 2 & 6 & 3 & 7 \end{pmatrix} \text{decomposed to}$$

$$\begin{pmatrix} 0 & 3 & 5 & 6 \\ 0 & 5 & 6 & 3 \end{pmatrix} \text{ and } \begin{pmatrix} 1 & 2 & 4 & 7 \\ 4 & 1 & 2 & 7 \end{pmatrix}$$

The same conclusion holds for the class of multistage networks.

Corollary 2 Any interstage permutation in an n×n network, which could be a baseline, omega, Banyan, or their reverse networks, can be decomposed to two self-mapping semi-permutations with the input sets being A and B respectively.

Finally, the following remark, concerning the possibility of decomposing interstage permutations to opposite-mapping semi-permutations, holds.

Remark 4 There does not exist any decomposition of the interstage permutation to opposite-mapping semi-permutations for the class of multistage networks. The reason is that any such interstage permutation maps 0 to 0 itself Theorem 4 Let the stage permutation $\sigma_i$ of each stage in a baseline network take either $\phi_1$ or I. Then any admissible permutation shown in (3) has a crosstalk-free decomposition of semi-permutations.

Proof. First, the case $\sigma_i$=I for any $0 \leq i \leq m-1$ is considered. Notice that by the first part of Remark 3, the permutation $\pi_{m-2}\pi_{m-3} \cdots \pi_1\pi_0$ need only be considered. By Theorem 3 each $\pi_i$ can be decomposed to two self-mapping semi-permutations $s_i$ and $t_i$ with InputSet($s_i$)=OutputSet ($s_i$)=A and InputSet($t_i$)=OutputSet($t_i$)=B. By Lemma 2, $\pi_{m-2}\pi_{m-3} \cdots \pi_1\pi_0$ can be decomposed to two crosstalk-free semi-permutations $s_{m-2}s_{m-2}s_{m-3} \cdots s_1s_0$ and $t_{m-2}m_{m-3} \cdots t_1t_0$, which are self-mapping.

For the general case, one crosstalk-free semi-permutation need only be constructed; its twin can be obtained symmetrically. First take a semi-permutation $\sigma_{0,s}$ decomposed from $\sigma_0$ with the input set A regardless $\sigma_0$=I or $\phi_1$. Then take a semi-permutation $\pi_{0,s}$ decomposed from $\pi_0$ with the input set A or B depending on $\sigma_0$=I or $\phi_1$. In step i, take semi-permutation $\sigma_{i,s}$ decomposed from $\sigma_i$ with the input set equal to OutputSet($\pi_{i-1,s}\sigma_{i-1,s} \cdots \pi_{0,s}\sigma_{0,s}$), which is either A or B, and then take a semi-permutation $\pi_{i,s}$ decomposed from $\pi_i$ with the input set equal to OutputSet($\sigma_{i,s}\pi_{i-1,s}\sigma_{i-1,s} \cdots \pi_{0,s}\sigma_{0,s}$), which is either A or B, and so on. Finally, $\sigma_{m-1,s}\pi_{m-2,s}\pi_{m-2,s} \cdots \pi_{0,s}\pi_{0,s}$ is obtained. This last expression is a decomposed crosstalk-free semi-permutation, and is self-mapping (or opposite-mapping) if the number of $\sigma_i$'s which are equal to $\phi_1$ is even (or odd).

For example, in an 8×8 baseline network, the admissible permutation with switch setting I at each stage, which corresponds to the first row of Latin square (7), $$\begin{pmatrix} 0 & 1 & 2 & 3 & 4 & 5 & 6 & 7 \\ 0 & 4 & 2 & 6 & 1 & 5 & 3 & 7 \end{pmatrix} =$$

$$\pi_1\pi_0 = \begin{pmatrix} 0 & 1 & 2 & 3 & 4 & 5 & 6 & 7 \\ 0 & 2 & 1 & 3 & 4 & 6 & 5 & 7 \end{pmatrix}\begin{pmatrix} 0 & 1 & 2 & 3 & 4 & 5 & 6 & 7 \\ 0 & 4 & 1 & 5 & 2 & 6 & 3 & 7 \end{pmatrix}$$

is decomposed to $$\begin{pmatrix} 0 & 3 & 5 & 6 \\ 0 & 3 & 6 & 5 \end{pmatrix} \begin{pmatrix} 0 & 3 & 5 & 6 \\ 0 & 5 & 6 & 3 \end{pmatrix} = \begin{pmatrix} 0 & 3 & 5 & 6 \\ 0 & 6 & 5 & 3 \end{pmatrix} \text{ and}$$

$$\begin{pmatrix} 1 & 2 & 4 & 7 \\ 2 & 1 & 4 & 7 \end{pmatrix} \begin{pmatrix} 1 & 2 & 4 & 7 \\ 4 & 1 & 2 & 7 \end{pmatrix} = \begin{pmatrix} 1 & 2 & 4 & 7 \\ 4 & 2 & 1 & 7 \end{pmatrix}$$

and the permutation with switch settings I, $\phi_1$, I, which corresponds to the in square (7), $$\begin{pmatrix} 0 & 1 & 2 & 3 & 4 & 5 & 6 & 7 \\ 2 & 6 & 0 & 4 & 3 & 7 & 1 & 5 \end{pmatrix} = \pi_1 \phi_1 \pi_0 = \begin{pmatrix} 0 & 1 & 2 & 3 & 4 & 5 & 6 & 7 \\ 0 & 2 & 1 & 3 & 4 & 6 & 5 & 7 \end{pmatrix}$$

$$\begin{pmatrix} 0 & 1 & 2 & 3 & 4 & 5 & 6 & 7 \\ 1 & 0 & 3 & 2 & 5 & 4 & 7 & 6 \end{pmatrix} \begin{pmatrix} 0 & 1 & 2 & 3 & 4 & 5 & 6 & 7 \\ 0 & 4 & 1 & 5 & 2 & 6 & 3 & 7 \end{pmatrix}$$

is decomposed to $$\begin{pmatrix} 1 & 2 & 4 & 7 \\ 2 & 1 & 4 & 7 \end{pmatrix} \begin{pmatrix} 0 & 3 & 5 & 6 \\ 1 & 2 & 4 & 7 \end{pmatrix} \begin{pmatrix} 0 & 3 & 5 & 6 \\ 0 & 5 & 6 & 3 \end{pmatrix} = \begin{pmatrix} 0 & 3 & 5 & 6 \\ 2 & 4 & 7 & 1 \end{pmatrix}$$

and $$\begin{pmatrix} 0 & 3 & 5 & 6 \\ 0 & 3 & 6 & 5 \end{pmatrix} \begin{pmatrix} 1 & 2 & 4 & 7 \\ 0 & 3 & 5 & 6 \end{pmatrix} \begin{pmatrix} 1 & 2 & 4 & 7 \\ 4 & 1 & 2 & 7 \end{pmatrix} = \begin{pmatrix} 1 & 2 & 4 & 7 \\ 6 & 0 & 3 & 5 \end{pmatrix}$$

Figure 6A:
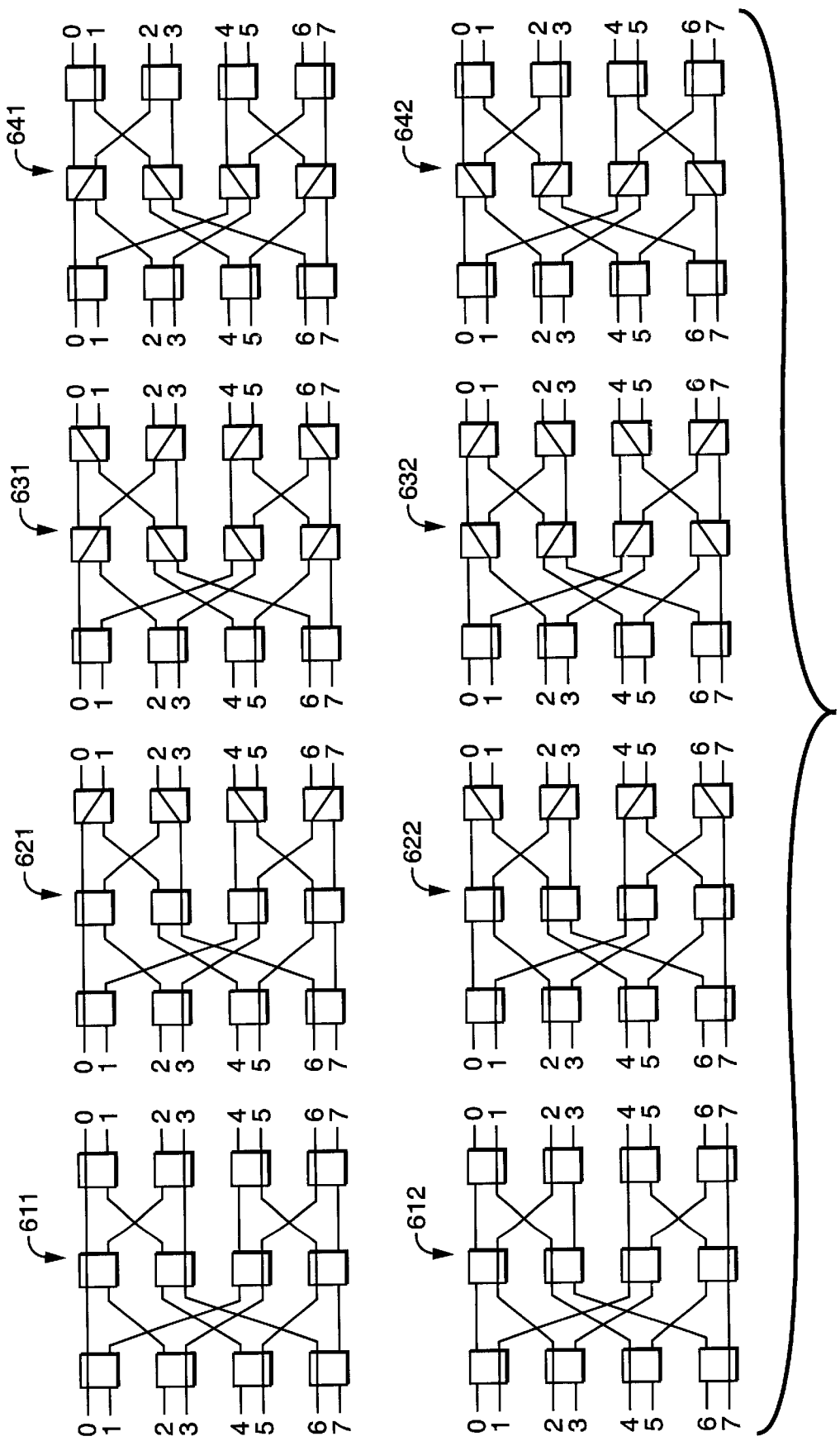
FIG. 6 (FIGS. 6A and 6B) shows all crosstalk-free routings corresponding to the semi-permutations decomposed from the permutations which form a Latin square in an 8×8 baseline network.
Figure 6B:
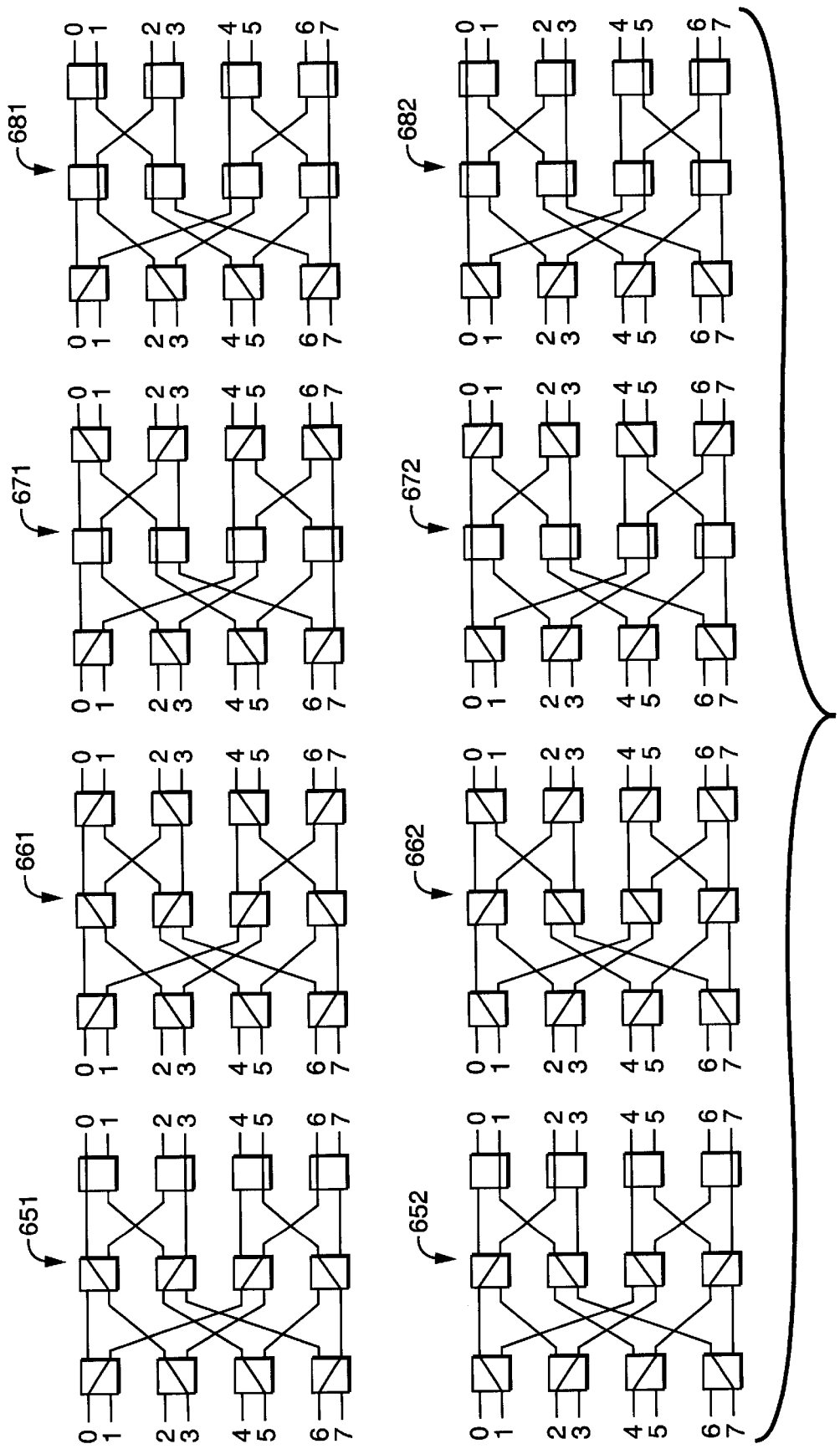

In FIG. 6, (FIGS. 6A and 6B) all crosstalk-free routings are listed that correspond to the semi-permutations decomposed from permutations which form a Latin square in (7), in an 8×8 baseline network. To realize all-to-all personalized exchange in an n×n baseline network and other similar networks, 2n passes of crosstalk-free routings are possible. In particular, routing patterns 611 and 612 have switch settings I, I, and I in columns one, two, and three respectively and correspond to the first row the Latin square L; the routing patterns 621 and 622 have switch settings I, I, and $\phi_1$ in columns one, two, and three respectively and correspond to the second row of the Latin square L; the routing patterns 631 and 632 have switch settings I, $\phi_1$, and $\phi_1$ in columns one, two, and three respectively and correspond to the third row of the Latin square L; the routing pattern 641 and 642 have switch settings I, $\phi_1$, and I in columns one, two, and three respectively and correspond to the fourth row of the Latin square L; the routing pattern 651 and 652 have switch settings $\phi_1$, $\phi_1$, and I in columns one, two, and three respectively and correspond to the fifth row of the Latin square L; the routing pattern 661 and 662 have switch settings $\phi_1$, $\phi_1$, and $\phi_1$ in columns one, two, and three respectively and correspond to the sixth row of the Latin square L; the routing pattern 671 and 672 have switch settings $\phi_1$. I, and $\phi_1$ in columns one, two, and three respectively and corresponds to the seventh row of the Latin square L; and the routing pattern 681 and 682 have switch settings $\phi_1$, I, and I in columns one, two, and three respectively and correspond to the eighth row of the Latin square L.

The crosstalk-free decomposition for a special set of permutations, which correspond to the all-to-all personalized exchange Latin square for a class of multistage network, have already been given. Since these networks are self-routing and have a unique path between each pair of input and output, the overall crosstalk-free semi-permutations need only be known, without being concerned too much about the details in the internal stages. This follows from the results established above, which already guarantee the correctness of the routing. Furthermore, for any such permutations, their semi-permutations have input set and output set equal to set A or set B. Therefore, after A and B are obtained as defined in (8), two semi-permutations for each permutation corresponding to one row in the all-to-all personalized exchange Latin square may be generated by masking the permutation by A or B.

An approach for generating the sets A and B is to calculate them directly by definition (8), which takes at least $\Omega(nm) = \Omega(n \log n)$ time because each bit of a number needs to be counted. In the following, an O(n) time procedure to generate sets A and B is given.

For each number i in $\{0,1,\ldots,n-1\}$ where $n=2^m$, a tag taglist (l) is assigned to it such that taglist (i)=0 if Bits(i) is even, and the taglist(i)=1 of Bits(i) is odd. Any number with its tag being 0 will be put in the set A, otherwise to be put in B. However, directly computing Bits(·) needs to be avoided. To see how to efficiently assign a tag for each number, the following fact may be observed. For any $k \geq 1$, for consecutive numbers $0,1,\ldots 2^k-1$, divide them from the middle into two consecutive parts, the $k^{th}$ bits of numbers in the first part are all 0's, and those in the second part are all 1's. Thus, the odd-even list of the second part is negated from that of the first part.

Figure 7:
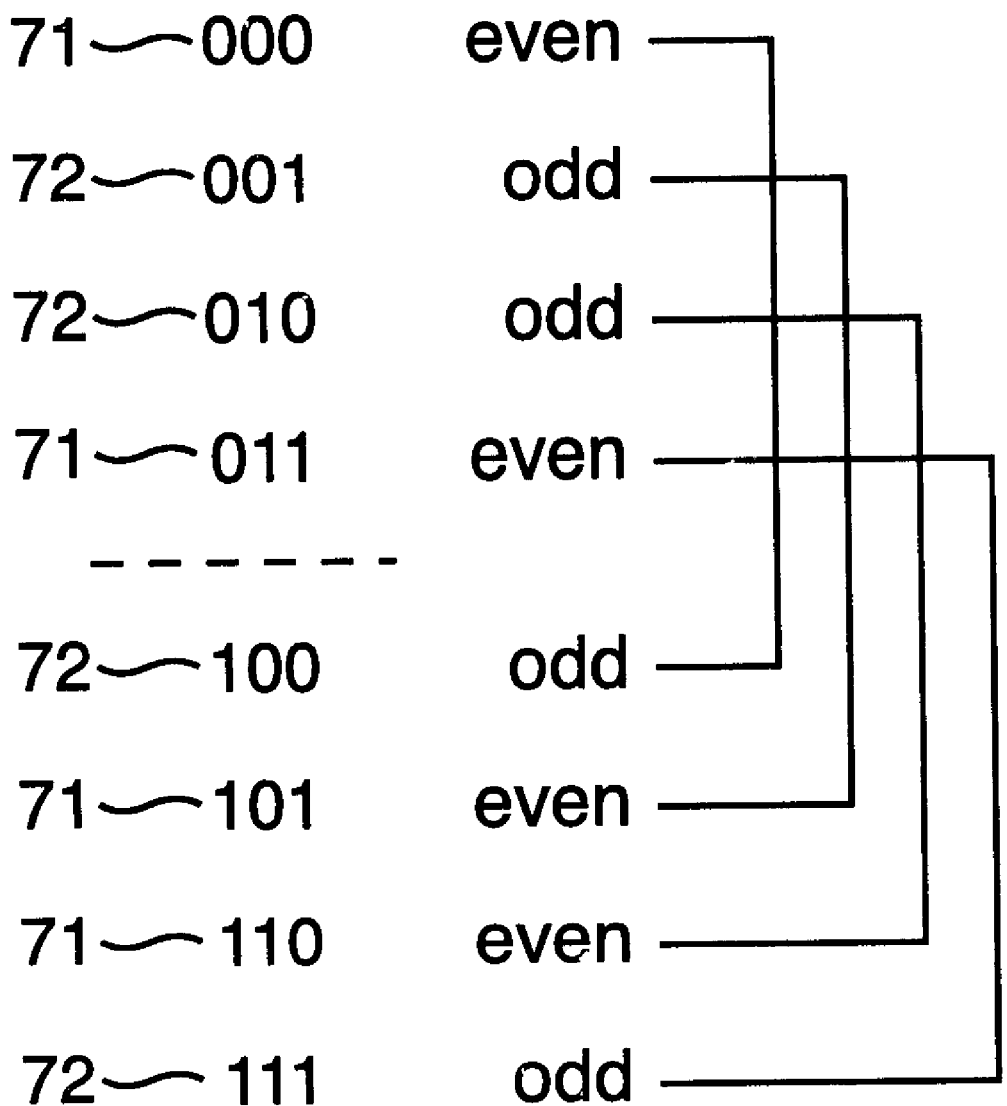
FIG. 7 shows the odd-even list of numbers 0, 1, . . . , $2^{k-1}$ for k=3.

FIG. 7 is relevant to the computation of the sets A and B for k=3. Binary numbers 71 correspond to numbers with an even number of 1s in their binary representation. Binary numbers 72 correspond to numbers with an odd number of 1s in their binary representation. The resultant procedure for calculating the sets A and B is shown in Table II. The procedure GenSemiSets(·) included below calls a recursive function GenTag(·) to generate a tag list of 0's and 1's, then builds the set A and B based on the tag list. The function Negate(·) used in GenTag(·) returns a new tag list with each tag negated from corresponding tag in the input tag list; while the function Concat(·) returns a concatenation of two tag list. For example, for n=16, the resulting tag list is $\{0,1,1,0,1,0,0,1,1,0,0,1,0,1,1,0\}$ and thus A=$\{0,3,5,6,9,10,12,15\}$ and B=$\{1,2,4,7,8,11,13,14\}$ which correspond to the 0's and the 1's in the tag list respectively. To analyze the complexity if the procedure, let T(n) denote the time for GenTag(n). Note that T(n)=r(n/2)+n. Thus T(n)=O(n), and the time for GenSemiSets(·) is O(n) as well.

The uniqueness of crosstalk-free decomposition of the special admissible permutations for a baseline network is now discussed, and the same conclusion can be drawn for other multistage networks. The decomposition of interstage permutation $\pi_i$ ($0 \leq i < m-2$) is the starting point. Notice that the self-mapping decomposition of $\pi_i$ for $i \geq 0$ is not unique. For example, in an 8×8 network, the permutation $$\pi_1 = \begin{pmatrix} 0 & 1 & 2 & 3 & 4 & 5 & 5 & 7 \\ 0 & 2 & 1 & 3 & 4 & 6 & 5 & 7 \end{pmatrix}$$

has two self-mapping decompositions, which also appear after Theorem 3, $$\begin{pmatrix} 0 & 3 & 5 & 6 \\ 0 & 3 & 6 & 5 \end{pmatrix} \text{ and } \begin{pmatrix} 1 & 2 & 4 & 7 \\ 2 & 1 & 4 & 7 \end{pmatrix}.$$

$$\text{Another is } \begin{pmatrix} 0 & 3 & 4 & 7 \\ 0 & 3 & 4 & 7 \end{pmatrix} \text{ and } \begin{pmatrix} 1 & 2 & 5 & 6 \\ 2 & 1 & 6 & 5 \end{pmatrix}.$$

However, for the permutation $\pi_0$, the following result holds.

Theorem 5 The permutation $\pi_0$ has a unique self-mapping decomposition.

Theorem 6 The special admissible permutation described above has a unique crosstalk/free decomposition such that each of the semi-permutations decomposed from a stage permutation and an interstage permutation is self-mapping or opposite-mapping.

Proof. First, by Remark 4 above, any interstage permutation does not have opposite-mapping decomposition. Then by Theorem 5, interstage permutation $\pi_0$ has a unique self-mapping decomposition. Notice that in the proof of Theorem 4, the resulting crosstalk-free semi-permutation is a composition of semi-permutations decomposed from those stage permutations and interstage permutations including $\pi_0$. Therefore, the special admissible permutation has a unique crosstalk-free decomposition.

TABLE II

Decomposition procedure

Procedure GenSemiSets (Set A, Set B, int n = $2^m$)
{
A = NULL;
B = NULL;
List taglist = GenTag(n);
for(i = 0; i<n; i++) {
  if (taglist [i] == 0)
    A = A + {i};
  else /* taglist[i] == 1 */
    B = 0 B + {i};
end for;
}
Function List GenTag (int n = $2^m$)
{
  if (n == 2)
    return List {0,1};
  List tmplist1 = GenTag(n/2);
  List tmplist2 = Negate(tmplist1);
  return List Concat (tmplist1, tmplist2);
}

To prove Theorem 5, the following preliminary results may be used.

Lemma 6 Let $\rho_s$ be a self-mapping semi-permutation decomposed from a permutation $\rho$ with InputSet($\rho_s$)=OutputSet($\rho_s$) denoted as C. Given any c ($0 \leq c \leq n-1$), $c \in C$ if and only if $\rho(c) \in C$.

Proof. If $c \in C$=InputSet($\rho_s$) then $\rho(c)=\rho_s(c) \in$OutputSet ($\rho_s$)=C. On the other hand, suppose $\rho(c) \in C$ but $c \notin C$, i.e., $c \in D=\{0, 1, \ldots, n-1\}-C$. Note that by Lemma 4 $\rho_s$'s twin $\rho_t$ is also self-mapping, that is $\rho(c)=\rho_t(c) \in D$, which contradicts the assumption that $\rho(c) \in C$.

Lemma 7 Let $\pi_{0,s}$ and $\pi_{0,t}$ be self-mapping semi-permutations decomposed from $\pi_0$. Given c and d ($0 \leq c, d \leq n-1$) with binary representations $p_{m-1}p_{m-2} \cdots p_{i+1}p_ip_{i-1} \cdots p_1p_0$ and $p_{m-1}p_{m-2} \cdots p_{i+1}\overline{p_i}p_{i-1} \cdots p_1p_0$, respectively, where $0 \leq i \leq m-1$, if c is in the input set of one of the semi-permutations, then d is in the input set of the twin semi-permutations.

Proof: Let InputSet ($\pi_{0,s}$)=OutputSet ($\pi_{0,s}$)=C and InputSet ($\pi_{0,t}$)=OutputSet ($\pi_{0,t}$)=D. From (4), $\pi_0$ maps a number by 1-bit circular-right shifting its binary representation. Suppose the number $c \in C$. Since $\pi_{0,s}$ is a self-mapping semi-permutation decomposed from $\pi_0$, by using Lemma 6, $\pi_0(c), \pi_0^2(c), \ldots \pi_0^i(c) \in C$. Note that $\pi_0^i(c)$ is i-bit circular-right shifting of c's binary representation, that is, $p_{i-1} \cdots p_1p_0p_mp_{m-1}p_{m-2} \cdots p_{i+1}p_i \in C$. Let number d' denote $$p_{i+1} \cdots p_1p_0p_{m-1}p_{m-2} \cdots p_{i+1}\overline{p_i}.$$

Since $\pi_0^i(c)$ and d' differ only at the least significant bit, i.e., $\pi_0^i(c) \neq d'$, but $$\left\lfloor \frac{\pi_0^i(c)}{2} \right\rfloor = \left\lfloor \frac{d'}{2} \right\rfloor,$$

this implies that $d' \notin C$, that is, $d' \in D$. Using Lemma 6 again, $\pi_0^{-1}(d'), \pi_0^{-2}(d'), \ldots, \pi_0^{-1}(d') \in D$. Therefore, $d=\pi_0^{-i}(d') \in D$.

Lemma 8 Let $H_K=\{x/x \in \}0,1, \ldots, n-1)$ and Bits (x)=k), where $0 \leq k \leq m=\log n$. Let $\pi_{0,s}$ and $\pi_{0,t}$ be self-mapping semi-permutations decomposed from $\pi_0$ with InputSet($\pi_{0,s}$)=OutputSet($\pi_{0,s}$)=C and InputSet($\pi_{0,t}$)=OutputSet($\pi_{0,t}$)=D. Then $H_K$ is contained in either C or D.

Proof. Since an element in $\{0,1, \ldots, n-1\}$ is in either C of D, that if one element in $H_K$ is in C, then all elements in $H_K$ are in C, need only be proven. To facilitate our proof, swap mapping, which swaps a pair of 0 and 1 in the binary representation of an integer, may be defined. Since any such swap mapping does not change the number of 1's in the binary representation, if $h \in H_K$ and h is mapped to h' by swap mapping, then $h' \in H_K$. The result that if $h \in C$ then $h' \in C$ is now proven. In fact, let h be $p_{m-1} \cdots p_i \cdots p_j \cdots p_o$ and h' be $p_{m-1} \cdots p_j \cdots p_i \cdots p_0$, where $$p_i = \overline{p_j}.$$

Since $h \in C$, by Lemma 7, $$p_{m-1} \cdots \overline{p_i} \cdots p_j \cdots p_0 \in D$$

and then $$p_{m-1} \cdots \overline{p_i} \cdots \overline{p_j} \cdots p_0 \in C$$

which implies h'=$p_{m-1} \cdots p_j \cdots p_i \cdots p_0 \in C$.

Also notice that given any h, $h'' \in H_K$, h can be transformed into h'' by a limited number of swap mappings. Therefore if $h \in C$, all elements in $H_k$ belong to C.

Lemma 9 Let $\pi_{0,s}$ and $\pi_{0,t}$ be self-mapping semi-permutations decomposed from $\pi_0$ with InputSet($\pi_{0,s}$)=OutputSet($\pi_{0,s}$)=C and InputSet($\pi_{0,t)=OutputSet(\pi_{0,t)}$)=D. Suppose $0 \in C$. Then C and D are exactly A and B defined in (8).

Proof. Since $0 \in H_0$ and by assumption $0 \in C$, from Lemma 8 $H_0 \subseteq C$. On the other hand, from $0 \in C$ and Lemma 7, $1 \in D$. Again from Lemma 8, $H_1 \subseteq D$. Similarly, that $3 \in H_2 \subseteq C$ and $7 \in H_3 \subseteq D$ may also be shown. Repeatedly using Lemma 7 and 8, $H_0, H_2, \ldots, H_2\lfloor m/2 \rfloor \subseteq C$, and $H_1, H_3, \ldots, H_2\lceil m/2 \rceil_{-1} \subseteq D$. That is, $C=H_0 \cup H_2 \cup \ldots \cup H_2\lfloor m/2 \rfloor=A$, and $D=H_1 \cup H_3 \cup \ldots \cup H_2\lceil m/2 \rceil_{-1}=B$.

Finally, the proof of Theorem 5 can be obtained from Lemma 9.

Figure 9:
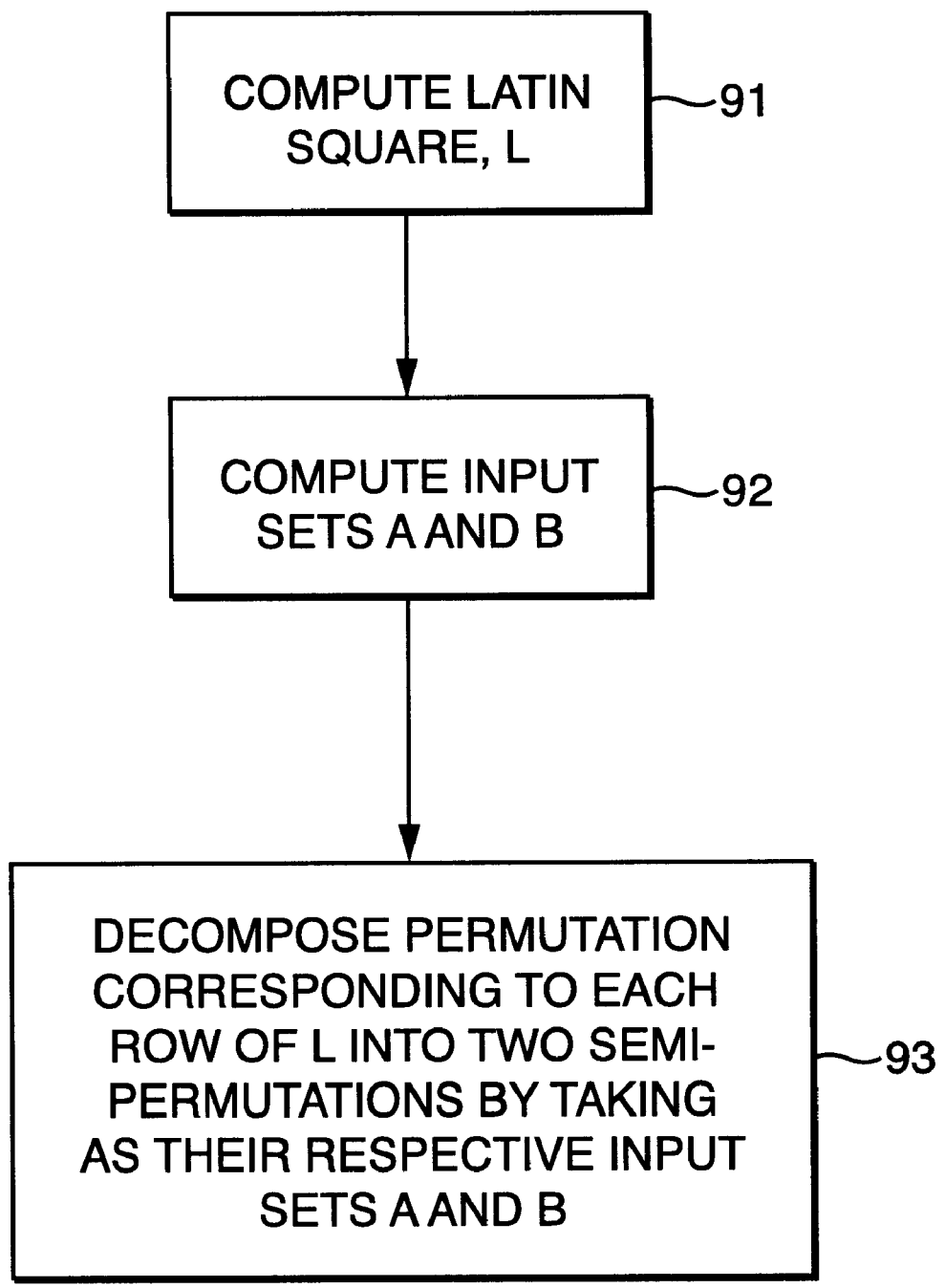
FIG. 9 shows a flow chart indicating some steps for achieving crosstalk-free, all-to-all exchange.

All the results are now in place to achieve crosstalk-free, all-to-all exchange in optical multistage networks. An overall flowchart is provided in FIG. 9. In step 91, a Latin square is computed which, for an m stage network, has $2^m$ rows and columns. A procedure for computing such a Latin square is given in the Appendix, but other procedures may also be used. In step 92, the sets A and B, which were defined above, are computed using, for example, the procedure GenSemiSets described above. In the final step 93, each permutation corresponding to each row of the Latin square is decomposed into two semi-permutations. This is achieved by taking A and B as the input sets of the two semi-permutations.

Many embodiments may use the foregoing techniques providing for crosstalk-free exchange. Much of the early use of multistage networks has been in connection with telecommunications switching. More recently, such networks have been incorporated in many data processing applications, both as switching networks and as parts of the processing units themselves in parallel processing arrangements.

Figure 10:
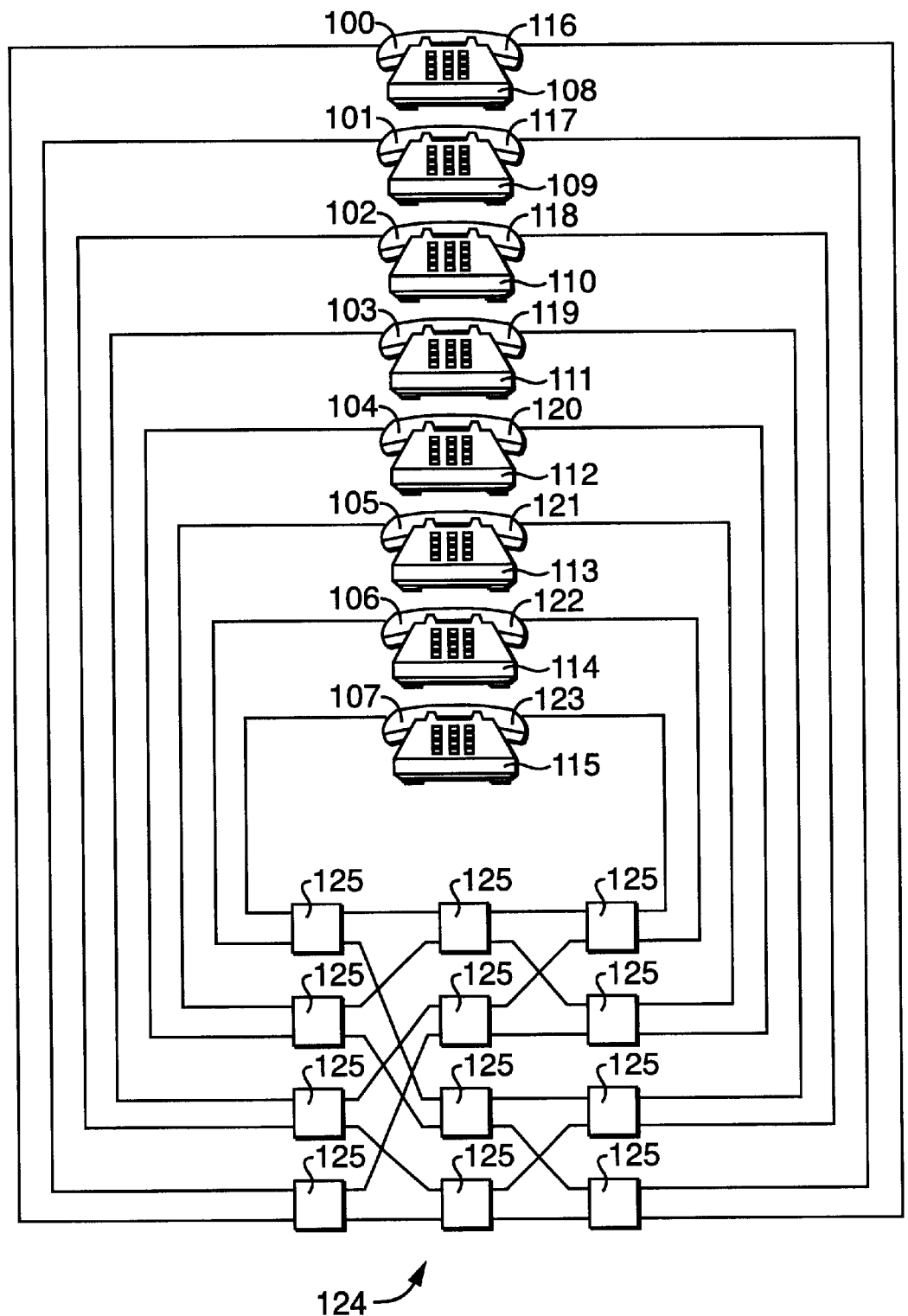
FIG. 10 shows an embodiment of the present invention involving teleconferencing.

In FIG. 10, an example of a telecommunication system, connecting several parties to each other, is shown. The system shown may be used for teleconferencing, where everyone involved in a conference call has the ability to speak to everyone else participating in the call. The telephone inputs 100–107 represent the mouthpieces of telephones 108–115 that permit voice input. The telephone outputs 116–123 represent the speakers of telephones 108–115 that permit the parties in a teleconferencing call to hear the transmitted voices. Multistage network 124, containing optical switches 125, is a network like the ones discussed above. The methods and systems of the present invention permit a more efficient operation of such a conference call by reducing the crosstalk in the optical switches 125.

Commercially available computers that make use of parallel architecture, such as the IBM SP2, use multistage networks to allow processors to exchange data. Presently, these types of computers use electronic switches to accomplish all-to-all exchange. However, there would be several advantages of converting the electronic switches to their optical analogues, such as the optical switches manufactured by Lucent Technologies™. To include the methods and systems described herein in computers employing parallel architecture, permitting crosstalk-free optical exchange may be useful to improve the efficiency of such computers.

Although parallel computers and telephone systems were just discussed with reference to embodiments of the present invention, the methods and systems of the present invention are useful wherever optical exchange of signals is indicated.

Appendix To prove Theorem 2, generic approaches may be introduced to construct a Latin square by using the basic permutations $\phi_i$'s defined in (6). Some nice properties of the basic permutations are apparent in the following lemma. These properties are useful in our later discussions.

Lemma 10 The set of basic permutations $\phi_i (1 \leq i \leq m)$ defined in (6) satisfy the following $$\phi_i \phi_j = \phi_j \phi_i, \text{ for } 1 \leq i,j \leq m \quad (10)$$

and $$\phi_i \phi_i = I, \text{ for } 1 \leq i,j \leq m \quad (11)$$

Proof. The exchangeability (10) follows from the definition of the basic permutations. In fact, any binary number $p_{m-1} p_{m-2} \cdots p_{i-1} \cdots p_{j-1} \cdots p_{j-1} \cdots p_1 p_0$ can be mapped to $$p_{m-1} p_{m-2} \cdots \overline{p}_{i-1} \cdots \overline{p}_{j-1} \cdots p_{j-1} \cdots p_1 p_0$$

by either permutation $\phi_i \phi_j$ or permutation $\phi_j \phi_i$. Similarly, (11) holds, as may be seen by observing that applying the composition of two $\phi_i$'s implies first flipping the $i_{th}$ bit and then flipping it back. The construction of a Latin square by using the basic permutations may now be achieved.

The First Construction of a Latin Square

Given m basic permutations $\phi_1, \phi_2, \ldots, \phi_m$, a permutation set may be constructed as follows.

$$\Psi = \{\phi_{i_1} \phi_{i_2} \cdots \phi_{i_k} | m \geq i_1 < i_2 < \ldots < i_k \geq 1 \text{ and } k \geq 1\} \quad (12)$$

For example, for n=8, $$\Psi = \{\phi_1, \phi_2, \phi_3, \phi_2 \phi_1, \phi_3 \phi_1, \phi_3 \phi_2, \phi_3 \phi_2 \phi_1\}$$

Based on the properties (10) and (11) in Lemma 10, any composition of one or more basic permutations equals one of the permutations in $\Psi$. Take the composition $\phi_1, \phi_2, \phi_1$, as an example. Since $$\phi_1 \phi_2 \phi_1 = (\phi_1 \phi_2) \phi_1 = (\phi_2 \phi_1) \phi_1 = \phi_2 (\phi_1 \phi_1) = \phi_2 I = \phi_2,$$

this composition equals $\phi_2$ which belongs to $\Psi$.

It is easy to see how many permutations are in set $\Psi$. In fact, there are $$\binom{m}{1}$$

permutations which are composed of one basic permutation, $$\binom{m}{2}$$

permutations which are composed of two basic permutations, and so on. Since $$\binom{m}{1} + \binom{m}{2} + \ldots + \binom{m}{m} = 2^m - 1 = n - 1$$

it follows that $|\Psi| = n-1$.

Based on the permutation set $\Psi$, Latin squares may be constructed as described in the following theorem.

Theorem 7 Let $\rho_1, \rho_2 \ldots \rho_{n-1}$ be the n-1 permutations in $\Psi$, and $a_0, a_1, \ldots, a_{n-1}$ be a list of numbers such that $\{a_0, a_1, \ldots, a_{n-1}\} = \{0, 1, \ldots, n-1\}$. Then the following matrix is a Latin square.

$$\begin{bmatrix} a_0 & a_1 & a_2 & \ldots & a_{(n-1)} \\ \rho_1(a_0) & \rho_1(a_1) & \rho_1(a_2) & \ldots & \rho_1(a_{n-1}) \\ \rho_2(a_0) & \rho_2(a_1) & \rho_2(a_2) & \ldots & \rho_2(a_{n-1}) \\ \vdots & \vdots & \vdots & \vdots & \vdots \\ \rho_{n-1}(a_0) & \rho_{n-1}(a_1) & \rho_{n-1}(a_2) & \ldots & \rho_{n-1}(a_{n-1}) \end{bmatrix} \quad (13)$$

Proof. Since $\{a_0, a_1, \ldots, a_{n-1}\} = \{0, 1, \ldots, n-1\}$ and each $p_i$ is a permutation, among the numbers in row i of the matrix, $\rho_i(a_0), \rho_i(a_1), \ldots, \rho_i(a_{n-1})$ any $\rho_i(a_j)$ is in $\{0, 1, \ldots, n-1\}$, and no two of them have the same value. Now consider the numbers in column j of the matrix, $a_j, \rho_1(a_j), \rho_2(a_j), \ldots, \rho_{n-1}(a_j)$. By the definition of $\Psi$ in (12) and the definition of $\phi_i$ in (6), if some $p_i$ is given, say $p_i = \phi_4 \phi_2 \phi_i$, then $p_i (a_j)$ is the number obtained by flipping bit 4, bit 2 and bit 1 of the binary representation of number $a_j$. That is, given $i \neq k$, $\rho_i (a_j) \neq \rho_k(a_j)$. Therefore $\rho_1, \rho_2, \ldots, \rho_{n-1}$ represent distinct non-identity permutations, and $a_j, \rho_1(a_j), \rho_2(a_j), \ldots, \rho_{n-1}(a_j)$ are n distinct numbers which cover all numbers in $\{1, \ldots, n-1\}$. Thus, the matrix is a Latin square.

The Second Construction of a Latin Square

Another technique is now provided for constructing a Latin square. The basic idea and method are briefly described here. A list of n−1 basic permutations (some of which may be identical), is first generated. Then the Latin square is built row by row in an iterative fashion, in the sense that the current row is obtained by applying a basic permutation in the list to the previously generated row. The detailed procedure is given in Table III, where LatinSquare is the main program, BuildBasicList is a recursive function to generate the basic permutation list, and BuildLatinSquare is the function which actually constructs a Latin square row by row.

TABLE III

The construction of a Latin square

```
Procedure Latin Square (List {α₀, α₁,..., α_{n-1}})/* main */
begin
    List BL - List {};
    BuildBasicList (m);/* m = log n */
    BuildLatinSquare (BL, {α₀, α₁,..., α_{n-1}});
end;
Function BuildBasicList (int k)
begin
    if(k == 1)
        BL.append (φ₁);
        return;
    end if
    BuildBasicList (k - 1);
    BL.append (φ_k);
    BuildBasicList (k - 1);
end;
Function BuildLatinSquare (List { φ_{k₁}, φ_{k₂},..., φ_{k_{n-1}}},
List {α₀,α₁,...,α_{n-1}})
begin
    for i = 0 to n - 1 do
        if(i == 0)
            b₀ = α₀; b₁ = a₁; ...; b_{n-1} = α_{n-1};
        else
            b₀ = φ_{k_i}(b₀);b₁ =φ_{k_i}(b₁);...;b_{n-1} =φ_{k_i}(b_{n-1});
        end if;
        output List {b₀, b₁, ..., b_{n-1}} as one row of the Latin
square;
    end for;
end;
```

Figure 8:
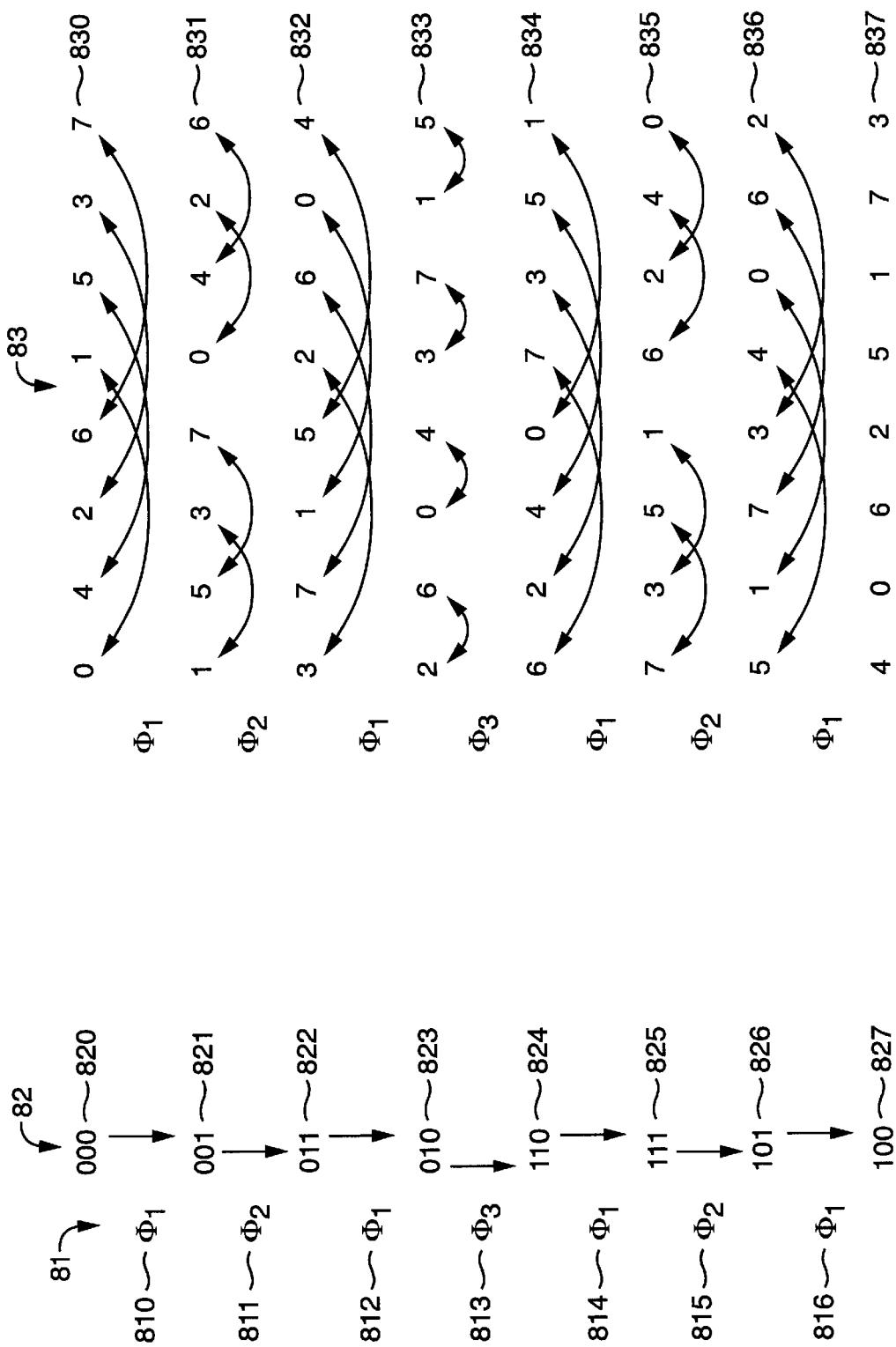
FIG. 8 shows the 3-bit Gray code sequence generated in one embodiment by applying basic permutations.

The example in FIG. 8 may be used to illustrate the procedure. FIG. 8 shows the 3-bit Gray code sequence 82 generated by applying the list of basic permutations 81 corresponding to n=8. The first binary number 821 is the image of the zeroth binary number 820 under the zeroth basic permutation 810. The second binary number 822 is the image of the first binary number 821 under the first basic permutation 811. The third binary number 823 is the image of the second binary number 822 under the second basic permutation 812. The fourth binary number 824 is the image of the third binary number 823 under the third basic permutation 813. The fifth binary number 825 is the image of the fourth binary number 824 under the fourth basic permutation 814. The sixth binary number 826 is the image of the fifth binary number 825 under the fifth basic permutation 815. The seventh binary number 827 is the image of the sixth binary number 826 under the sixth basic permutation 816.

Also shown in FIG. 8 is a set of rows 83 generated by applying the list of basic permutations 81. The first row 831 is the image of the zeroth row 830 under the zeroth basic permutation 810. The second row 832 is the image of the first row 831 under the first basic permutation 811. The third row 833 is the image of the second row 832 under the second basic permutation 812. The fourth row 834 is the image of the third row 833 under the third basic permutation 813. The fifth row 835 is the image of the fourth row 834 under the fourth basic permutation 814. The sixth row 836 is the image of the fifth row 835 under the fifth basic permutation 815. The seventh row 837 is the image of the sixth row 836 under the sixth basic permutation 816.

For n=8, the list of basic permutations 81 obtained is $\{\phi_1, \phi_2, \phi_1, \phi_3, \phi_1, \phi_2, \phi_1,\}$. Applying this list to the zeroth binary number 820, whose value is 0, a set of binary numbers, (000, 001, 011, 010, 110, 111, 101, 100}, is obtained, which is the 3-bit Gray code sequence 82. Given the zeroth row 830, given by 0, 4, 2, 6, 1, 5, 3, 7, the procedure LatinSquare generates a Latin square row by row by applying the list of basic permutations 81, as shown in FIG. 8.

In general, the following theorems regarding this approach hold.

Theorem 8 The matrix constructed by procedure Latin-Square in Table III is a Latin square.

Theorem 9 The Latin square in Theorem 8 is equivalent to that in Theorem 7.

Proof of Theorem 2:

As set forth above, the overall permutation of a baseline network is $\sigma_{m-1}\pi_{m-2}\sigma_{m-2} \cdots \pi_0\sigma_0$, where interstage permutations $\pi_i$'s are defined in (4) and the stage permutations $\sigma_i$'s now take either $\phi_1$ or I. The following lemmas concerning the properties of the compositions of $\pi_i$'s and $\sigma_i$'s hold.

Lemma 11 The composition of i $(1 \leq i \leq m-1)$ consecutive interstage permutations $\pi_{m-2}, \pi_{m-3}, \ldots, \pi_{m-i-j}$, is the following permutation $$p_{m-1}p_{m-2}\cdots p_{i+1}p_i\cdots p_1 p_0 \xrightarrow{\pi_{m-2}\pi_{m-3}\cdots\pi_{m-i-1}} \quad (14)$$
$$p_{m-1}p_{m-2}\cdots p_{i+1}\cdots p_0 p_1 \cdots p_i$$

Proof. Applying $\pi_{m-i-1}, \pi_{m-i}, \ldots, \pi_{m-3}, \pi_{m-2}$, by one to a binary number $p_{m-1}p_{m-2} \cdots p_1p_0$, we have $$p_{m-1}\cdots p_{i+1}p_i\cdots p_1 p_0 \xrightarrow{\pi_{m-i-1}}$$
$$p_{m-1}\cdots p_{i+1}p_0 p_i\cdots p_1 \xrightarrow{\pi_{m-i}} p_{m-1}\cdots p_{i+1}\cdots p_0 p_1 p_i\cdots p_3 p_2 \xrightarrow{\pi_{m-i+1}}$$
$$\cdots \xrightarrow{\pi_{m-3}} p_{m-1}\cdots p_{i+1}p_0 p_1 \cdots p_{i-2}p_i p_{i-1} \xrightarrow{\pi_{m-2}} p_{m-1}\cdots p_{i+1}p_0 p_1\cdots p_{i-1}p_i$$

which completes the proof.

Let $$\pi = \pi_{m-2}\pi_{m-3} \cdots \pi_1\pi_0 \quad (15)$$

which is the composition of all $\pi_i$'s. $\pi$ can also be viewed as the overall permutation of a baseline network in which all switches are set to parallel.

The following Corollary gives a special case of Lemma 11, which indicates that $\pi$ maps a binary number to its reversal.

Corollary 3

$$p_{m-1}p_{m-2}\cdots p_1 p_0 \xrightarrow{\pi} p_0 p_1 \cdots p_{m-2}p_{m-1} \quad (16)$$

Corollary 4 The composition of the i $(1 \leq i \leq m-1)$ consecutive $\pi_j$'s, $\phi_1$, and $\phi_{i+1}$, satisfies the following equation:

$$(\pi_{m-2}\pi_{m-3} \cdots \pi_{m+1}) \phi_1 \cdot \phi_{i+1}(\pi_{m-2}\pi_{m-3} \cdots \pi_{m-i-1}) \quad (17)$$

Proof: From Lemma 11 and mapping (6), the permutations on both sides of (17) map $$p_{m-1}p_{m-2} \cdots p_1 p_0 \text{ to } p_{m-1}p_{m-2} \cdots p_{i+1}\overline{p_0}p_1 \cdots p_r$$

Proof of Theorem 2: Since each stage permutation $\sigma_i$ takes either $_{100}$ $_1$ or I, the overall permutation $\sigma_{m-1}\pi_{m-2}\sigma_{m-2} \cdots \pi_0\sigma_0$ has the following general form for $k \geq 1$ and $0 \leq i_1 < i_1 < i_2 < \ldots < i_k \leq m-1$ $$\pi_{m-2} \cdots \pi_{m-i_1 31} {}_1\phi_1\pi_{m-i_1-2} \cdots \pi_{m-1_2-1}\phi_1\pi_{m-i_2-2} \cdots \pi_{m-i_k-1}\phi_1\pi_{m-i_k-2} \cdots \pi_1\pi_0 \quad (18)$$

Notice that when $i_1=0$, (18) becomes $$\phi_1\pi_{m-2} \cdots \pi_{m-i_2-1}\phi_1\pi_{m-i_2-2} \cdots \pi_{m-i_k-1}\phi_1\pi_{m-i_k-2} \cdots \pi_1\pi_0$$

By repeatedly using Corollary 4, (18) becomes $$(\phi_{i_1+1}\phi_{i_2+1} \cdots \phi_{i_k+1})(\pi_{m-2}\pi_{m-3} \cdots \pi_1\pi_0) = (\phi_{i_1+1}\phi_{i_2+1} \cdots \phi_{i_k+i})\pi = (\phi_{i_k+1}\phi_{i_{k-1}+1} \cdots \phi_{i_1+1})\pi$$

Comparing the set $$\{\phi_{i_k+1}\phi_{i_{k-1}+1} \cdots \phi_{i_1+1} 51\ k \geq 1,\ 0 \leq i_1 < i_2 < \cdots < i_k \leq m-1\}$$

with the definition of $\Psi$ in (12), they are exactly the same. Letting $a_0 = \pi(0), a_1 = \pi(1), \ldots, a_{n-1}\pi(n-1)$, and using Theorem 7, all permutations of form (18) form a Latin square. In addition, $\pi$ corresponds to the first row of the Latin square.

The procedure LatinSquare (List $\{\pi(0), \pi(1), \ldots, \pi(n-1)\}$) may be used to construct the Latin square for a baseline network. For example, for an 8×8 network, by Corollary 3, the first row, $\pi(0), \pi(1), \ldots, \pi(n-1)$, may be computed, which is 0,4,2,6,1,5,3,7. LatinSquare may then be called to generate the rest n−1 rows of the Latin square shown in (7).

We claim:

1. A method for crosstalk-free all-to-all exchange in an optical multistage self-routing network having inputs and outputs coupled to processors comprising sending messages between the processors in multiple passes, wherein, in each of the multiple passes, each of the processors transmits, in one-to-one fashion, a message to one of the processors by way of the inputs and outputs, in accord with semi-permutations decomposed from permutations corresponding to rows of a matrix.

2. A method as in claim 1, wherein the optical multistage self-routing network is one of a baseline network, omega network, Banyan network, reverse baseline network, reverse omega network, and reverse Banyan network.

3. A method for crosstalk-free all-to-all exchange in an optical multistage self-routing network having inputs and outputs coupled to processors comprising sending messages between the processors in multiple passes, wherein, in each of the multiple passes, each of the processors transmits, in one-to-one fashion, a message to one of the processors by way of the inputs and outputs, in accord with semi-permutations decomposed from permutations corresponding to rows of a Latin square.

4. A method for crosstalk-free all-to-all exchange in an optical multistage self-routing network as in claim 3, wherein said semi-permutations are obtained by computing two input sets of whole numbers.

5. A method for crosstalk-free all-to-all exchange in an optical multistage self-routing network having n inputs and n outputs coupled to an even number, $n \geq 2$, of processors, and wherein each of the n processors is connected to one of the n inputs and one of the n outputs, comprising computing a Latin square having n rows and n columns;

associating the n rows with n admissible permutations, each of the n admissible permutations being a one-to-one mapping from $N = \{0, 1, \ldots, n-1\}$ to itself;

for j a member of the set $\{1, 2, \ldots, n\}$, decomposing a jth permutation, from among the n admissible permutations, into two semi-permutations, one of the two semi-permutations, $s^{(j)}$, being a restriction of said mapping to a subset, $S^{(j)}$, of N having n/2 elements, and another of the two semi-permutations, $t^{(j)}$, being a restriction of said mapping to a subset, $T^{(j)}$, of N where $T^{(j)}$ is a complement $N \setminus S^{(j)}$;

sending n/2 messages in a (2j−1)th pass, and n/2 messages in a (2j)th pass, each of the messages departing from one of the n processors, traveling through one of the n inputs and one of the n outputs, and arriving at one of the n processors, wherein a kth processor from among the n processors sends a message to an lth processor from among the n processors in the (2j−1)th pass if, and only if, $s^{(j)}(k) = l$, and a qth processor from among the n processors sends a message to an rth processor from among the n processors in the (2j)th pass if, and only if, $t^{(j)}(q) = r$; and for different $j = 1, \ldots, n$, repeating said step of decomposing a jth permutation from among the n admissible permutations until all of the n admissible permutations have been decomposed;

for different $j = 1, \ldots, n$, repeating said step of sending n/2 messages in a (2j−1)th pass, and n/2 messages in a (2j)th pass until $n^2$ messages have been sent, and 2n passes have occurred, corresponding to 2n decompositions of the n admissible permutations.

6. A method as in claim 5, wherein computing a Latin square having n rows and n columns includes computing a Latin square off-line.

7. A method as in claim 5, wherein the optical multistage self-routing network is one of a baseline network, omega network, Banyan network, and their reverse networks.

8. A method as in claim 5, wherein the optical multistage self-routing network includes $m = \log_2 n$ stages, each stage having n/2 switches, and each switch having two switch settings, interspersed by m−1 interstage links, wherein computing a Latin square includes computing a Latin square so that each of the n rows corresponds, in one-to-one fashion, with a configuration of switch settings.

9. A method as in claim 5, wherein the optical multistage self-routing network has $m = \log_2 n$ stages interspersed by m−1 interstage links, further comprising composing each of the n admissible permutations as a composition of 2m−1 permutations, a jth permutation from among the n admissible permutations composed as $$\sigma^{(j)}_{m-1}\pi^{(j)}_{m-2}\sigma^{(j)}_{m-2} \cdots \pi^{(j)}_0\sigma^{(j)}_0,$$

such that to each of the m stages there is associated a stage permutation and to each of the m−1 interstage links there is associated an interstage link permutation, where the stage permutation corresponding to the jth permutation from among the n admissible permutations, and associated with an ith stage is denoted by $\sigma^{(j)}_i$, with $i = 1, \ldots, m$, and the interstage link permutation corresponding to the jth permutation from among the n admissible permutations, and associated with an ith interstage link is denoted by $\pi^{(j)}_i$, with $i = 1, \ldots, m-1$.

10. A method of achieving all-to-all crosstalk-free exchange in an optical multistage self-routing network, said network having an even number, $n \geq 2$, of processors, comprising computing an n×n matrix $$\begin{bmatrix} a_{0,0} & a_{0,1} & \cdots & a_{0,n-1} \\ a_{1,0} & a_{1,1} & \cdots & a_{1,n-1} \\ \vdots & \vdots & \vdots & \vdots \\ a_{n-1,0} & a_{n-1,1} & \cdots & a_{n-1,n-1} \end{bmatrix}$$

such that each entry of the matrix is chosen from the set $N = \{0, 1, \ldots, n=1\}$, and such that a set of members of each row equals the set N, and a set of members of each column equals the set N;

mapping the matrix to a column vector of permutations $$\begin{bmatrix} \rho^{(0)} \\ \rho^{(1)} \\ \vdots \\ \rho^{(n-1)} \end{bmatrix}$$

where a jth entry of the column vector of permutations, $\rho^{(j)}$, is given by $$\begin{pmatrix} 0 & 1 & 2 & \ldots & n-1 \\ a_{j,0} & a_{j,1} & a_{j,2} & \ldots & a_{j,n-1} \end{pmatrix},$$

decomposing each permutation, $\rho^{(j)}$, into two semi-permutations, $s^{(j)}$, and $t^{(j)}$, each of which can be realized crosstalk-free, given by $$s^{(j)} = \begin{pmatrix} b_{j,0} & b_{j,1} & \ldots & b_{j,n/2-1} \\ c_{j,0} & c_{j,1} & \ldots & c_{j,n/2-1} \end{pmatrix} \text{ and}$$

$$t^{(j)} = \begin{pmatrix} d_{j,0} & d_{j,1} & \ldots & d_{j,n/2-1} \\ e_{j,0} & e_{j,1} & \ldots & e_{j,n/2-1} \end{pmatrix},$$

where $s^{(j)}$ is a restriction of the permutation $\rho^{(j)}$ to a subset, $S^{(j)}$, of N having n/2 elements, and $t^{(j)}$ is a restriction of the permutation $\rho^{(j)}$ to a subset, $T^{(j)}$, of N where $T^{(j)}$ is a complement $N \backslash S^{(j)}$;

in a first pass, sending messages from processor $b_{0j}$ to processor $c_{0j}$ for $j=0, \ldots, n/2-1$;

in a second pass, sending messages from $d_{0j}$ to processor $e_{0j}$ for $j=0, \ldots, n/2-1$;

in a third pass, sending messages from processor $b_{1,j}$ to processor $c_{1,j}$ for $j=0, \ldots n/2-1$; and in a fourth pass, sending messages from $d_{1,j}$ to processor $e_{1,j}$ for $j=0, \ldots, n/2-1$.

11. A method of achieving all-to-all crosstalk-free exchange in an optical multistage self-routing network, said network having an even number, $n \geq 2$, of processors, comprising computing an n×n matrix $$\begin{bmatrix} a_{0,0} & a_{0,1} & \ldots & a_{0,n-1} \\ a_{1,0} & a_{1,1} & \ldots & a_{1,n-1} \\ \vdots & \vdots & \vdots & \vdots \\ a_{n-1,0} & a_{n-1,1} & \ldots & a_{n-1,n-1} \end{bmatrix}$$

such that each entry of the matrix is chosen from the set $N=\{0,1, \ldots, n-1\}$, and such that a set of members of each row equals the set N, and a set of members of each column equals the set N;

mapping the matrix to a column vector of permutations $$\begin{bmatrix} \rho^{(0)} \\ \rho^{(1)} \\ \vdots \\ \rho^{(n-1)} \end{bmatrix}$$

where a jth entry of the column vector of permutations, $\rho^{(j)}$, is given by $$\begin{pmatrix} 0 & 1 & 2 & \ldots & n-1 \\ a_{j,0} & a_{j,1} & a_{j,2} & \ldots & a_{j,n-1} \end{pmatrix},$$

decomposing each permutation, $\rho^{(j)}$, into two semi-permutations, $s^{(j)}$, and $t^{(j)}$, each of which can be realized crosstalk-free, given by $$s^{(j)} = \begin{pmatrix} b_{j,0} & b_{j,1} & \ldots & b_{j,n/2-1} \\ c_{j,0} & c_{j,1} & \ldots & c_{j,n/2-1} \end{pmatrix} \text{ and}$$

$$t^{(j)} = \begin{pmatrix} d_{j,0} & d_{j,1} & \ldots & d_{j,n/2-1} \\ e_{j,0} & e_{j,1} & \ldots & e_{j,n/2-1} \end{pmatrix},$$

where $s^{(j)}$ is a restriction of the permutation $\rho_{(j)}$ to a subset, $S^{(j)}$, of N having n/2 elements, and $t^{(j)}$ is a restriction of the permutation $\rho^{(j)}$ to a subset, $T^{(j)}$, of N where $T^{(j)}$ is a complement $N \backslash S^{(j)}$;

in a (2i−1)th pass, sending messages from processor $b_{i-1,j}$ to processor $c_{i-1,j}$ for $j=0, \ldots, n/2-1$, for $i=1, \ldots, n$;

in a (2i)th pass, sending messages from $d_{i-1,j}$ to processor $e_{i-1,j}$ for $j=0, \ldots n/2-1$, for $i=1, \ldots, n$.

12. A system for all-to-all crosstalk-free exchange comprising an optical multistage self-routing network associated with a Latin square having n columns and n rows, wherein the optical multistage network includes an even number, $n \geq 2$, of processors;

instructions for said even number of processors to associate the n rows with n admissible permutations, each of the n admissible permutations being a one-to-one mapping from $N=\{0,1, \ldots, n-1\}$ to itself;

for j a member of the set $\{1, 2, \ldots, n\}$, instructions for said even number of processors to decompose a jth permutation from among the n admissible permutations into two semi-permutations, one of the two semi-permutations, $s^{(j)}$, being a restriction of said mapping to a subset, $S^{(j)}$, of N having n/2 elements, and another of the two semi-permutations, $t^{(j)}$, being a restriction of said mapping to a subset, $T^{(j)}$, of N where $T^{(j)}$ is a complement $N \backslash S^{(j)}$;

instructions for said even number of processors to initiate the transmittal of n/2 messages in a (2j−1)th pass, and n/2 messages in a (2j)th pass, each of the messages departing from one of the n processors, traveling through one of the n inputs and one of the n outputs, and arriving at one of the n processors, wherein a kth processor from among the n processors sends a message to an lth processor from among the n processors in the (2j−1)th pass if, and only if, $s^{(j)}(k)=l$, and a qth processor from among the n processors sends a message to an rth processor from among the n processors in the (2j)th pass if, and only if, $t^{(j)}(q)=r$; and for different $j=1, \ldots, n$, instructions for said even number of processors to continue to decompose a jth permutation from among the n admissible permutations until all of the n admissible permutations have been decomposed; and for different $j=1, \ldots, n$, instructions for said even number of processors to continue to send n/2 messages in a (2j−1)th pass, and n/2 messages in a (2j)th pass until $n^2$ messages have been sent, and 2n passes have occurred, corresponding to 2n decompositions of the n admissible permutations.

13. A system for all-to-all crosstalk-free exchange as in claim 12 wherein an optical multistage self-routing network includes one of a Banyan network, an omega network, a baseline network, and their reverse networks.

14. A system for all-to-all crosstalk-free exchange as in claim 12, wherein instructions for said even number of processors to decompose a jth permutation from among the n admissible permutations into two semi-permutations includes instructions to compute two input sets.

15. A system for all-to-all crosstalk-free exchange as in claim 12, wherein instructions for said even number of processors to decompose a jth permutation from among the n admissible permutations into two semi-permutations includes instructions to compute two input sets in a time on the order of $O(n)$.

16. A system for crosstalk-free all-to-all exchange in an optical multistage self-routing network comprising processors; and instructions for said processors to send messages between the processors in multiple passes, wherein, in each of the multiple passes, each of the processors transmits, in one-to-one fashion, a message to one of the processors in accord with semi-permutations decomposed from permutations corresponding to rows of a matrix.

17. A system for crosstalk-free all-to-all exchange in an optical multistage self-routing network as in claim 16, wherein the matrix is a Latin square.

18. A system for crosstalk-free all-to-all exchange in an optical multistage self-routing network as in claim 17, wherein instructions for said processors to send messages between the processors includes instructions to compute input sets from which the semi-permutations may be obtained.

19. A system for crosstalk-free all-to-all exchange in an optical multistage self-routing network as in claim 17, wherein instructions for said processors to send messages between the processors includes instructions to compute input sets from which the semi-permutations may be obtained in a time on the order of $O(n)$ where the Latin square is an n×n matrix.

20. A system for crosstalk-free all-to-all exchange in an optical multistage self-routing network as in claim 17, wherein instructions for said processors to send messages between the processors includes instructions to compute two input sets from which the semi-permutations may be obtained.

\* \* \* \* \*